US009888054B2

(12) United States Patent
Yang et al.

(10) Patent No.: US 9,888,054 B2
(45) Date of Patent: Feb. 6, 2018

(54) SEAMLESS VIDEO PIPELINE TRANSITION BETWEEN WIFI AND CELLULAR CONNECTIONS FOR REAL-TIME APPLICATIONS ON MOBILE DEVICES

(71) Applicant: Apple Inc., Cupertino, CA (US)

(72) Inventors: Yan Yang, San Jose, CA (US); Xiasong Zhou, Campbell, CA (US); Hyeonkuk Jeong, Saratoga, CA (US); Joe S. Abuan, Cupertino, CA (US); Gobind Johar, San Jose, CA (US); Yichao Shen, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/379,592

(22) Filed: Dec. 15, 2016

(65) Prior Publication Data

US 2017/0099338 A1     Apr. 6, 2017

Related U.S. Application Data

(63) Continuation of application No. 14/338,734, filed on Jul. 23, 2014, now Pat. No. 9,553,913.

(60) Provisional application No. 62/005,263, filed on May 30, 2014.

(51) Int. Cl.
*H01L 29/06* (2006.01)
*H04N 7/15* (2006.01)
*H04W 36/14* (2009.01)
*H04W 84/04* (2009.01)
*H04L 29/06* (2006.01)

(52) U.S. Cl.
CPC .......... *H04L 65/80* (2013.01); *H04L 65/1083* (2013.01); *H04N 7/15* (2013.01); *H04W 36/14* (2013.01); *H04W 84/045* (2013.01)

(58) Field of Classification Search
CPC .... H04L 65/80; H04L 65/1083; H04W 36/14; H04W 84/045
USPC ............... 348/14.01–14.16; 370/259–271; 370/351–357; 709/201–207
See application file for complete search history.

(56) References Cited

U.S. PATENT DOCUMENTS

| 8,208,001 B2 | 6/2012 | Tucker et al. |
| 8,502,856 B2 | 8/2013 | Crantill et al. |
| 8,542,265 B1 | 9/2013 | Dodd et al. |
| 2010/0142616 A1* | 6/2010 | Hegde ............... H04N 21/6437 375/240.15 |

(Continued)

*Primary Examiner* — Hemant Patel
(74) *Attorney, Agent, or Firm* — Meyertons Hood Kivlin Kowert & Goetzel, P.C.; Jeffrey C. Hood

(57) ABSTRACT

Performing a real-time application on a mobile device, involving communication of audio/video packets with a remote device. The mobile device may initially communicate the audio/video packets on a first communication channel with the remote device. During the real-time communication, the mobile device may determine if no packets have been received by the mobile device from the remote device for a first threshold period of time. If no packets have been received by the mobile device from the remote device for the first threshold period of time, the mobile device may establish a second communication channel for transmission of the audio/video packets with the remote device. In response to using the second communication channel, the mobile device may modify a resolution or bit rate of the audio/video packets transmitted to the remote device.

20 Claims, 12 Drawing Sheets

(56) References Cited

U.S. PATENT DOCUMENTS

| | | | |
|---|---|---|---|
| 2011/0279640 A1* | 11/2011 | Choi | H04N 7/148 348/14.12 |
| 2011/0283009 A1* | 11/2011 | Martinez | H04N 21/6125 709/231 |
| 2012/0066596 A1* | 3/2012 | Feng | H04N 7/15 715/719 |
| 2012/0086767 A1 | 4/2012 | Lau et al. | |
| 2013/0095806 A1 | 4/2013 | Salkintzis et al. | |
| 2013/0100228 A1 | 4/2013 | Tapia et al. | |
| 2015/0103885 A1 | 4/2015 | Feng et al. | |
| 2015/0222849 A1 | 8/2015 | Kang et al. | |

\* cited by examiner

SEAMLESS VIDEO PIPELINE TRANSITION BETWEEN WIFI AND CELLULAR CONNECTIONS FOR REAL-TIME APPLICATIONS ON MOBILE DEVICES

PRIORITY INFORMATION

The present application is a continuation of U.S. patent application Ser. No. 14/338,734 titled "Seamless Video Pipeline Transition Between WiFi and Cellular Connections for Real-Time Applications on Mobile Devices" and filed Jul. 23, 2014, whose inventors are Yan Yang, Xiasong Zhou, Hyeonkuk Jeong, Joe S. Abuan, Gobind Johar, and Yichao Shen, which claims benefit of priority to provisional patent application No. 62/005,263, entitled "Seamless Video Pipeline Transition Between WiFi and Cellular Connections for Real-Time Applications on Mobile Devices", filed on May 30, 2014, whose inventors are Yan Yang, Xiasong Zhou, Hyeonkuk Jeong, Joe S. Abuan, Gobind Johar, and Yichao Shen, and which are all hereby incorporated by reference in their entirety as though fully and completely set forth herein.

FIELD OF THE INVENTION

The present application relates to wireless devices, and more particularly to providing an improved user experience for real-time applications executing on a mobile device using redundant transmission channels.

DESCRIPTION OF THE RELATED ART

Wireless communication systems are rapidly growing in usage. Further, wireless communication technology has evolved from voice-only communications to also include the transmission of data, such as Internet and multimedia content. Some popular applications include videoconferencing (e.g., such as FaceTime™ from Apple) as well as media streaming. However, in many instances, the transmission of video content over a wireless communication channel such as WiFi suffers from channel degradation issues. Therefore, improvements are desired in wireless communication.

SUMMARY OF THE INVENTION

Embodiments described herein relate to a method for performing a real-time application on a mobile device, involving communication of audio/video packets with a remote device. The mobile device may initially communicate the audio/video packets on a first communication channel with the remote device. During the real-time communication, the mobile device may measure downlink channel quality of the first channel, e.g., by determining if no packets have been received by the mobile device from the remote device for a first threshold period of time. If no packets have been received by the mobile device from the remote device for the first threshold period of time, the mobile device may establish a second communication channel for transmission of the audio/video packets with the remote device.

In one embodiment, during the real-time application, the mobile device may capture first images from a camera of the mobile device using first camera capture settings having a first resolution. The mobile device may then communicate first multimedia packets, corresponding to the first images, on a first communication channel during a video session. In response to transitioning to communication of multimedia packets on a second communication channel during the video session, the mobile device may change the camera capture settings of the camera to second camera capture settings having a second resolution that is different from the first resolution. Accordingly, the mobile device may communicate second multimedia packets, corresponding to the second images, on the second communication channel during the video session.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
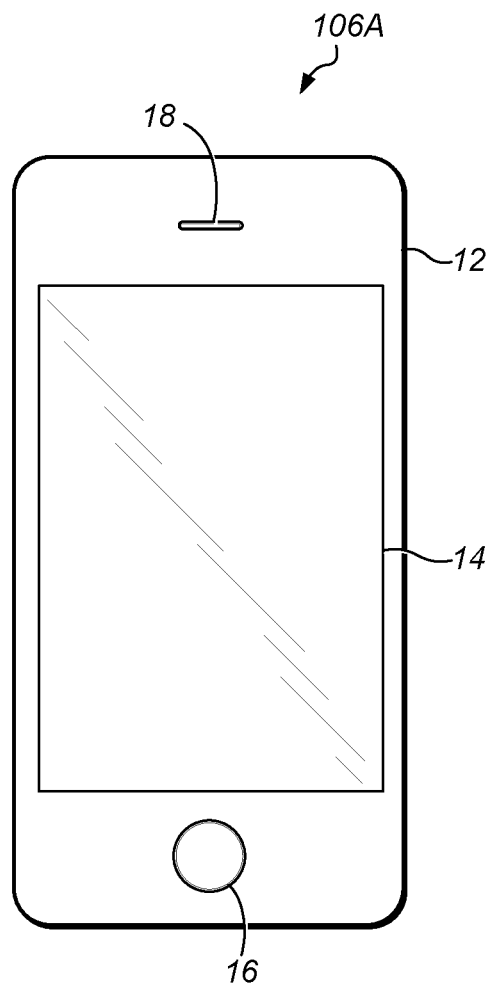
FIG. 1 illustrates an example mobile device, a smart phone, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.
WiFi: Wireless Fidelity
LTE: Long Term Evolution
RAT: Radio Access Technology
TX: Transmit
RX: Receive

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Mobile Device—any of various types of computer systems devices which are mobile or portable and which performs wireless communications using both cellular communication and WiFi communication. Examples of mobile devices include mobile telephones or smart phones (e.g., iPhone™, Android™-based phones), and tablet computers such as iPad, Samsung Galaxy, etc. Various other types of devices would fall into this category if they include both cellular and WiFi communication capabilities, such as laptop computers (e.g., MacBook), portable gaming devices (e.g., Nintendo DS™ PlayStation Portable™, Gameboy Advance™, iPhone™), portable Internet devices, and other handheld devices, as well as wearable devices such as wrist-watches, headphones, pendants, earpieces, etc. In general, the term "mobile device" can be broadly defined to encompass any electronic, computing, and/or telecommunications device (or combination of devices) which is easily transported by a user and capable of wireless communication using both WiFi and cellular communication.

Cellular—The term "cellular" has the full breadth of its ordinary meaning, and at least includes a wireless communication network or RAT distributed over land areas called "cells" and is used by virtually all mobile telephones today.

Cellular RAT—The term "cellular RAT" has the full breadth of its ordinary meaning, and at least includes any of the present or future radio access technologies used to communication on a cellular network, such as Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced, and other similar or future cellular RATs, including 3G, 4G, 5G, 6G, etc., cellular RATs.

Cellular Base Station—The term "Cellular Base Station" has the full breadth of its ordinary meaning, and at least includes a wireless cellular communication station installed at a fixed location and used to communicate as part of a cellular network or cellular radio access technology (RAT).

WiFi—The term "WiFi" has the full breadth of its ordinary meaning, and at least includes a wireless communication network or RAT that is serviced by wireless LAN (WLAN) access points and which provides connectivity through these access points to the Internet. Most modern WiFi networks (or WLAN networks) are based on IEEE 802.11 standards and are marketed under the name "WiFi". A WiFi (WLAN) network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
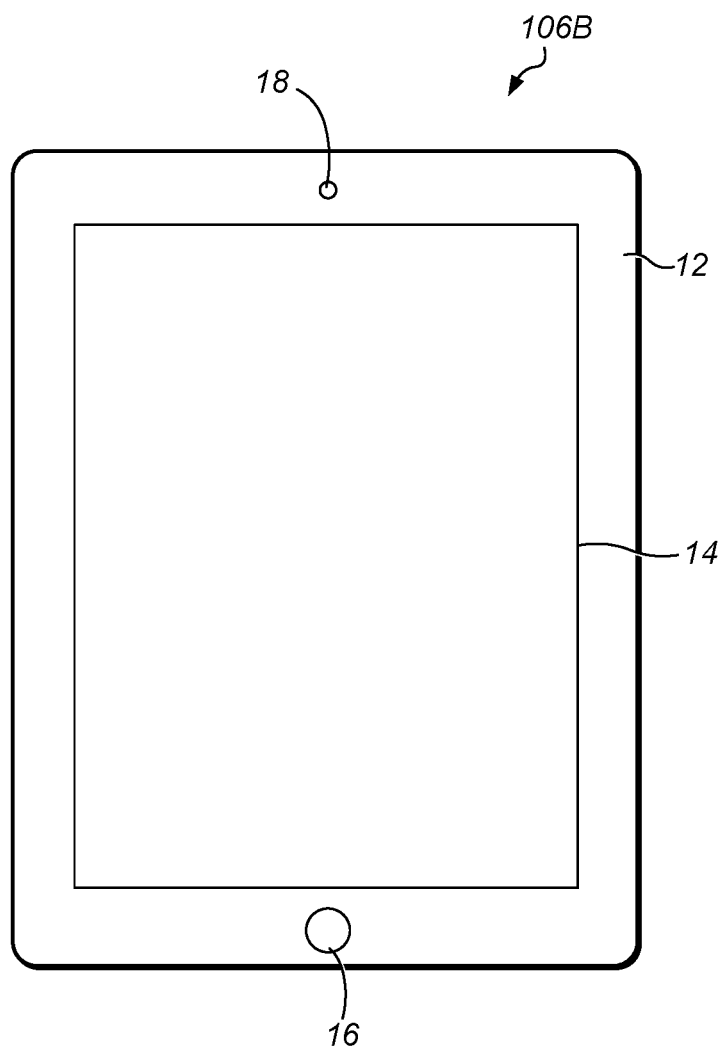
FIG. 2 illustrates another example mobile device, a table computer, according to one embodiment.

FIGS. 1 and 2—Mobile Device

FIG. 1 illustrates an example mobile device 106A according to one embodiment, in this case a telephone device, such as a smart phone. The term mobile device 106 may be any of various devices as defined above. FIG. 2 illustrates another example of mobile device 106B according to one embodiment, in this case a tablet device, such as a tablet computer, e.g., an iPad™, Samsung Galaxy™, and similar devices).

Mobile device 106 may include a housing 12 which may be constructed from any of various materials. Mobile device 106 may have a display 14, which may be a touch screen that incorporates capacitive touch electrodes. Display 14 may be based on any of various display technologies. The housing 12 of the mobile device 106 may contain or comprise openings for any of various elements, such as home button 16, speaker port 18, and other elements (not shown), such as microphone, data port, and possibly various other types of buttons, e.g., volume buttons, ringer button, etc.

The mobile device 106 may support multiple radio access technologies (RATs). For example, mobile device 106 may be configured to communicate using any of various cellular RATs. The mobile device 106 may also be configured to support at least one WiFi RAT, also known as Wireless LAN (WLAN). Various different or other RATs may be supported as desired.

The mobile device 106 may comprise one or more antennas. The mobile device 106 may also comprise any of various radio configurations, such as various combinations of one or more transmitter chains (TX chains) and one or more receiver chains (RX chains). For example, the mobile device 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

Figure 3:
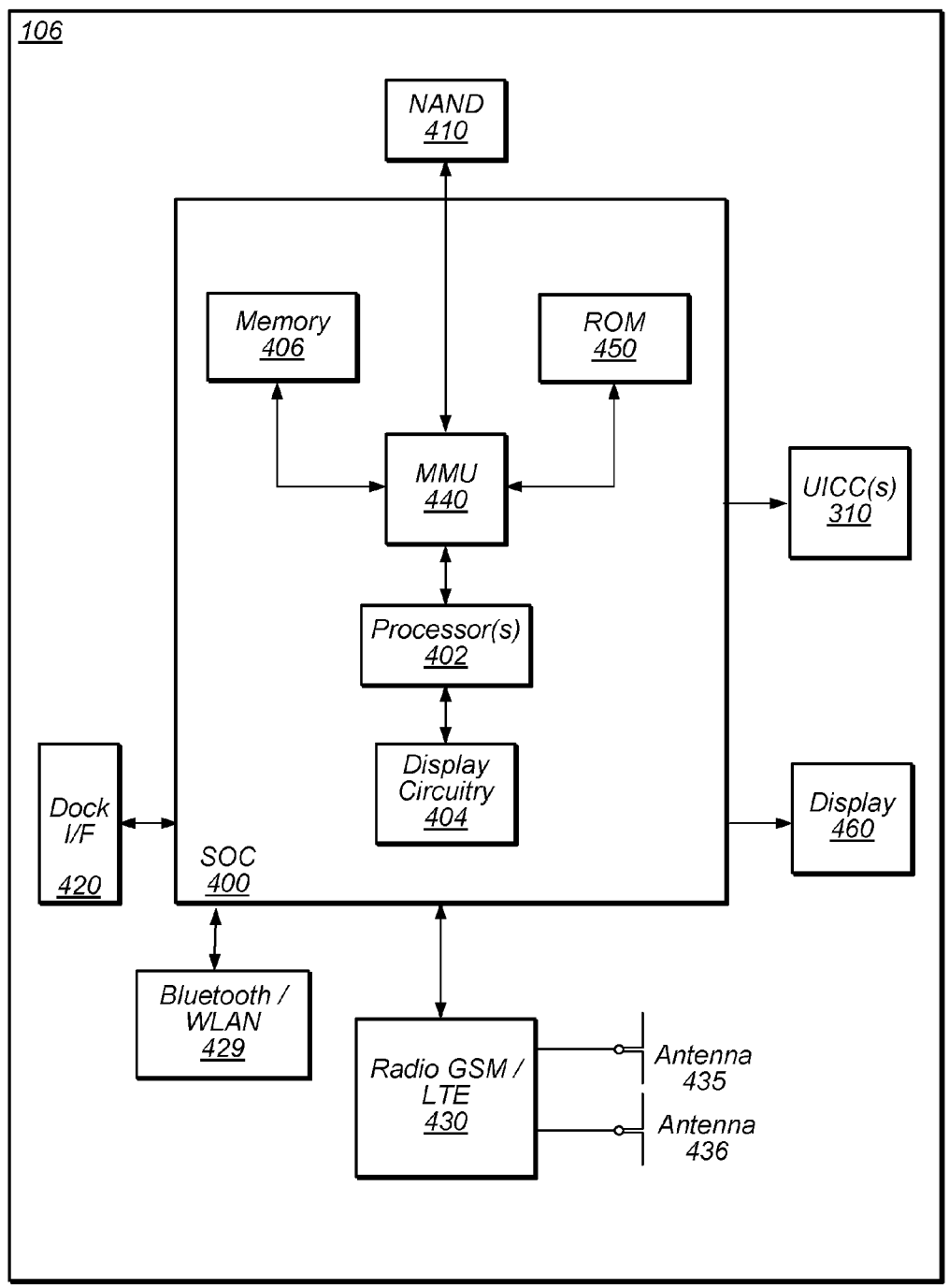
FIG. 3 is an example block diagram of a mobile device, according to one embodiment.

FIG. 3—Mobile Device Block Diagram

FIG. 3 illustrates an example simplified block diagram of a mobile device 106. As shown, the mobile device 106 may include a system on chip (SOC) 400, which may include portions for various purposes. The SOC 400 may be coupled to various other circuits of the mobile device 106. For example, the mobile device 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth™ and WiFi circuitry). The mobile device 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the mobile device 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card, or any combination thereof. Any of various other SIM configurations are also contemplated.

As noted above, the mobile device 106 may be configured to communicate wirelessly using multiple radio access technologies (RATs). The mobile device 106 may be configured to communicate according to a WiFi RAT and/or one or more cellular RATs, e.g., such as communicating on both WiFi and cellular at the same time. For example, the mobile device 106 may be communicating on a primary communication channel (such as WiFi), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the above features for establishing, removing, and/or adjusting primary and secondary communication channels, as well as the various other techniques described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 4:
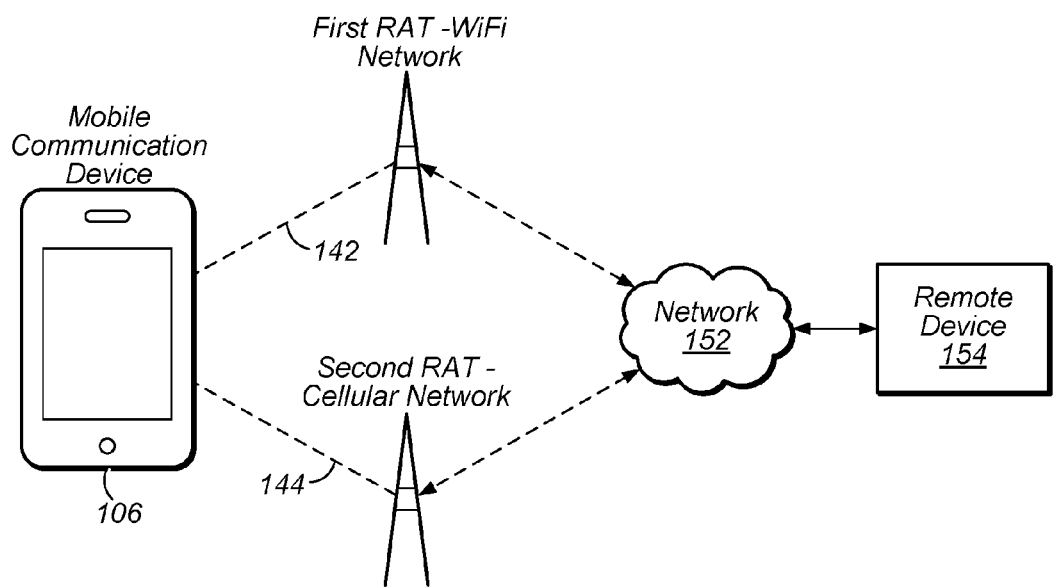
FIG. 4 illustrates an example wireless communication system where a mobile device communicates using two different channels associated with different RATs, respectively, according to one embodiment

FIG. 4—Communication System

FIG. 4 illustrates an exemplary (and simplified) wireless communication scenario involving multiple communication systems. It is noted that the system of FIG. 4 is merely one example of a possible system, and embodiments may be implemented in any of various systems, as desired.

As shown, the exemplary wireless communication system includes a mobile device 106 communicating over a primary communication channel 142. In this example, the primary communication channel is a WiFi network RAT, whereby the mobile device 106 communicates through a WiFi access point as shown. The mobile device 106 may also establish a secondary communication channel 144, e.g., in response to channel conditions of the primary communication channel 142, as discussed in more detail below. In this example, the secondary communication channel is a cellular network RAT, whereby the mobile device 106 communicates through a cellular base station as shown. The mobile device 106 may communicate over one or both of the primary communication channel 142 and the secondary communication channel 144 to communicate with a remote device 154, which is also discussed in more detail below. Additionally, note that the RATs shown in FIG. 4 are exemplary only, and that other combinations are envisioned, such as using multiple different cellular RATs, e.g., instead of or in addition to the WiFi RAT.

Note that FIG. 4 only illustrates one side of the communication scenario, that is, the side from the mobile device 106 to the network 152 (e.g., the Internet). The remote device 154 may similarly have one or more paths to the network 152 from its point of view, e.g., including WiFi and/or cellular networks, as desired. In one embodiment, a "channel" may be considered any end-to-end communication path between the mobile device 106 and the remote device 154 (e.g., and may be characterized or specified by pairs of addresses, e.g., IP address and port number combinations for the mobile device 106 and the remote device 154). For example, a primary channel (e.g., the channel 142) may involve the mobile communication device 106 communicating via WiFi to network 152 and the remote device 154 communicating via its own WiFi to the network 152. The secondary channel (e.g., the channel 144) may involve the mobile communication device 106 communicating via a cellular RAT to the network 152 and the remote device 154 communicating via its own cellular RAT to the network 152. However, while these examples show a mirrored path on each side, the remote device 154 may use any RAT for each channel, as appropriate. For example, the remote device 154 may use WiFi communication for both the primary channel and the secondary channel. Alternatively, the remote device 154 may use a cellular RAT for the primary channel and WiFi for the secondary channel. In some embodiments, the "channel" may be at an application level, although other levels are also envisioned, such as lower levels.

Establishing and Using Multiple Channels for Real-Time Applications

As mentioned previously some real-time applications on mobile devices suffer from a degraded transmission channel while performing the real-time applications. The real-time applications may include bidirectional real-time applications such as conferencing or videoconferencing, or may include unidirectional applications, where the flow of traffic is almost solely in one direction (e.g., except for feedback channels or data regarding the application), such as audio or video streaming. As an example of channel degradation during a real-time application, a video conferencing session using WiFi can become unusable and may even be abruptly dropped when WiFi signal degrades, which has a significant impact on the user experience of the real-time application. Therefore, it is important for real-time applications to minimize user impact caused by a degraded transmission channel. In order to address these and other issues, various embodiments may be implemented.

For example, in one embodiment, an algorithm to perform fast detection of degraded transmission channels on one or both of uplink and downlink may be implemented. Naive approaches may use packet loss, RTT ("round trip time"), or other similar measures to determine link quality. However, while these metrics may be useful for some purposes (e.g., and may be used to augment various methods described herein), they may generally be slow, inaccurate, and cannot distinguish between uplink and downlink. Because link quality may degrade from either downlink or uplink, or both, and it may typically take a long time to determine a failure on the channel using end-to-end metrics, a different approach may be used. Different amounts of quality degradation can occur on the downlink and uplink channels, and the quality degradation may occur at different speeds on the two links. Therefore different detection algorithms may be applied herein to the downlink and uplink channels in order to detect link quality degradation on the different links for fast detection.

For example, to determine link quality for the local downlink (e.g., from the access point or base station to the mobile device) or for the remote uplink (e.g., from the remote device to its access point or base station), the mobile device may determine if no packets have been received from the remote device for a first threshold of time (e.g., a "No-Remote" condition has occurred). In one embodiment, the first time threshold may be approximately three seconds, although the first threshold may vary, e.g., plus or minus two seconds or less. Upon reaching this condition, the mobile device may transmit a message indicating that the condition has been reached (e.g., by sending a "No-Remote" message to the remote device). Alternatively, the mobile device may periodically send such a message indicating the length of time since the mobile device has received a packet from the remote device, which the remote device can then use for its own algorithms, such as in the example in the following paragraph. One way to implement this feedback is to utilize the RTP Control (RTCP) protocol, where "RTP" stands for Real-time Transport Protocol. To reduce message overhead, such information can be incorporated within, or "piggy-backed" on, existing audio/video RTP packets. With RTP packets being sent at fixed intervals, further saving can be achieved by only using a bit-flag to indicate if a packet was received or not, instead of explicitly putting time information into the RTP packets.

Similarly, to determine link quality for the local uplink (e.g., from the mobile device to the access point or base station) or for the remote downlink (e.g., from the remote access point or base station to the remote device), the mobile device may determine if no packets have been received by the remote device form the mobile device for a second threshold of time (e.g., a "Remote-No-Remote" condition has occurred). In this case, the remote device may monitor for incoming packets transmit a message to the mobile device indicating the amount of time and/or that the amount of time has exceeded a threshold (e.g., the remote device may transmit a "No-Remote" message to the mobile device, indicating that the remote device has not received a packet from the mobile for an amount of time or that its "No-Remote" condition has been triggered). In some embodiments, the first and second thresholds may be the same. Alternatively, the first and second thresholds may be different. For example, the first threshold may be longer than the first threshold, e.g., in the example above, the first threshold may be three seconds, but the second threshold may be two seconds. Similar to above, while the example second threshold may be approximately two seconds, it may be other values, e.g., varying by plus or minus a second or more, as desired.

In response to one or both of the conditions above, a redundant channel may be established for the real-time application. For example, if the processes above indicate a loss of link quality for the channel (e.g., one or both of the time thresholds have been exceeded), then a process may be used to establish an additional channel between the mobile device and the remote device. For example, if the primary channel was a WiFi to WiFi channel (where both the mobile device and the remote device use WiFi for communicating using the real-time application), then the secondary channel may be a cellular to cellular channel (where both the mobile device and the remote device use a respective cellular RAT for communicating using the real-time application). Similarly, if the primary channel was cellular to cellular, then the secondary channel may be WiFi to WiFi. As another example, if the primary channel was WiFi to cellular, then the secondary channel may be cellular to WiFi. Similarly, if the primary channel was cellular to WiFi, then the secondary channel may be WiFi to cellular. If one side only has one RAT available (e.g., the remote device), then the primary channel may be switched from WiFi to cellular while the remote device uses the only RAT available.

In one embodiment, rather than establishing the secondary channel in response to these conditions, the secondary channels may have been previously negotiated or established, and the conditions may be used to determine that the secondary channel should begin to be used. For example, the secondary channel may have already been established, but not used, until the one or more of the thresholds have been met. Then, in one embodiment, packets (e.g., audio and/or video packets) of the real-time application may be transmitted over both the primary and the secondary channel concurrently, in a redundant fashion.

Transmitting data in dual channels can incur extra data charges to a user. For example, cellular carriers generally charge for data usage over a cellular connection. In some cases, transmission of data over a WiFi connection through a carrier's network can also result in charges. Hence, it is desirable to minimize the usage of dual channels to transmit audio/video data in order to reduce extra or unnecessary data usage charges. Therefore, once both channels are being used for the real-time application, an algorithm may be used to determine if and/or when to return to using a single channel (e.g., either the primary channel or the secondary channel or a further channel, depending on conditions). This algorithm may operate to determine when a single channel provides sufficient quality such that dual channels are no longer necessary.

Note that embodiments for transitioning from dual channel transmission to single channel transmission may be independent of the embodiments for transitioning from single channel transmission to dual channel transmission. For example, a different method than above may be used to transition from single to dual channel transmission and the following embodiments may be similarly implemented. Similarly, a different method than below for transitioning from dual channel transmission to single channel transmission in combination with the transition from single channel to dual channel transmission. Of course, both sets of embodiments may be used together in the same implementation, as desired.

Similar to above, naive approaches can measure RTT, PLR ("packet loss ratio"), etc. for performing this transition. However, while these metrics may be useful for some purposes (e.g., and may be used to augment various methods described herein), they may generally be slow, inaccurate, and cannot distinguish between uplink and downlink. Further, these naive approaches do not directly correlate networking related metrics to the actual user experience for an audio/video conferencing application.

In one embodiment, the mobile device may measure the percentage of received packets that are actually used by the real-time application, e.g., what percentage of the audio/video playback from audio/video decoder is used for each channel. In particular, during dual channel transmission, a same packet may be transmitted over both channels. However, there may be different latencies or issues associated with each channel, and the receiving device may receive the packets at different times, or may not receive them at all if there are channel issues. Thus, the receiving device (which may be the mobile device or the remote device) may use the first successfully received packet of the redundant packets and discard the other.

For example, an audio receiver in a video conferencing application normally maintains a jitter buffer to ensure smooth audio playback. Here the term "jitter" refers to variation in latency in the network, or more specifically the variability of the packet latency as measured over time across the network. A normal jitter buffer implementation usually discards duplicate or late arrived packets. Duplicate packets can be detected by comparing sequence numbers in the packets, e.g., the RTP sequence number. The discarded packets are generally not used for audio playback by the audio receiver. In a similar manner, when dual channels are being used as described herein, duplicate or redundant packets may be discarded and hence not used in a similar manner.

In this embodiment, the receiving device may then keep track of the percentage of packets used for each channel. For example, if the primary channel is very poor and most of the packets are not successfully transmitted, only 15% of the packets from the primary channel may be used, in which case, the primary channel may no longer be necessary. On the other hand, if most are successful, then perhaps 90% or more of the packets may come from the primary channel, in which case the secondary channel may no longer be necessary.

Thus, in one embodiment, the percentage of packets used may be compared to a threshold, e.g., for the primary channel, to determine whether to continue to perform dual channel transmission or transition to single channel transmission using the primary or secondary channel. For example, the threshold may be 70%, 80%, 90%, or 95% for switching to single channel transmission. As a specific example, if 88% of the packets are used for the primary channel, and the threshold is 90%, then dual channel transmission may be continued. However, if the percentage increases to 92%, then a transition to single channel transmission using the primary channel may be effected. Similarly, if the primary channel is used only 23% of the time and the threshold is 75%, then the secondary channel may be used as the single channel, if desired. Note that the threshold may be expressed as the percentage to exceed for either of the channels or as the lower threshold to discontinue use of one of the channels. For example, the threshold could be expressed as needing to exceed 75% to transition to only using that channel, or as needing to fall below 25% to transition to only using the other channel. Since there are only two channels in this embodiment, these are equivalent. For more than two channels, either embodiment may be used.

In one embodiment, this algorithm may be expressed as turning off transmission over redundant channel if the primary channel shows good percentage consistently and switching to the secondary (or redundant) channel if the primary channel shows poor percentage consistently. In effect, the latter results in upgrading the secondary channel to the primary channel. In order to avoid switching back and forth between single and dual channel transmission too often or too frequently, various logic or algorithms may be used. For example, various timing thresholds or other hysteresis algorithms may be used.

Alternatively, or additionally, the method may use various quality of service measures to determine if a single channel could be used. For example, in cases where either channel is acceptable, and so the percentage threshold may not be particularly useful (e.g., where both are equally fast or good, and the percentage is essentially arbitrary), then one of the channels may be selected for single transmission based on the quality of service being acceptable (e.g., exceeding a threshold). Said another way, if the quality of service of the primary channel is above a threshold, it may be used in single channel transmission rather than dual channel transmission. Similar remarks apply if the secondary channel exceeds the quality of service threshold.

In addition, note that there may generally be a preference for using one of the RATs over the other. For example, since WiFi data is typically not metered or charged, but cellular data is, various embodiments may prefer using WiFi over cellular whenever possible, e.g., until a threshold quality level cannot be maintained. As one example, it may be preferable to establish WiFi to WiFi channels as primary channels whenever the quality is acceptable (e.g., as opposed to using cellular for any of the legs of the channels). Similarly, secondary channels may prefer to use at least one WiFi leg of the channel, if possible. However, if the primary channel is WiFi to WiFi, it may be preferable for the secondary channel to be cellular to cellular (or, more generally, that the primary and secondary channels do not overlap in individual links) in order to ensure that the real-time application can be maintained, even when a link (e.g., one side's WiFi or cellular) fails completely. This preference may also extend to disabling the secondary channel, e.g., so that, if at all possible, the redundant transmission is disabled as soon as possible, while maintaining a desirable quality for the real-time application, in order to reduce charges to the user, e.g., by disabling the channel using cellular whenever possible.

Further, while examples above use cellular (e.g., which may be LTE) and WiFi, other embodiments are envisioned using any two or more RATs, as desired (e.g., multiple cellular RATs).

Figure 5:
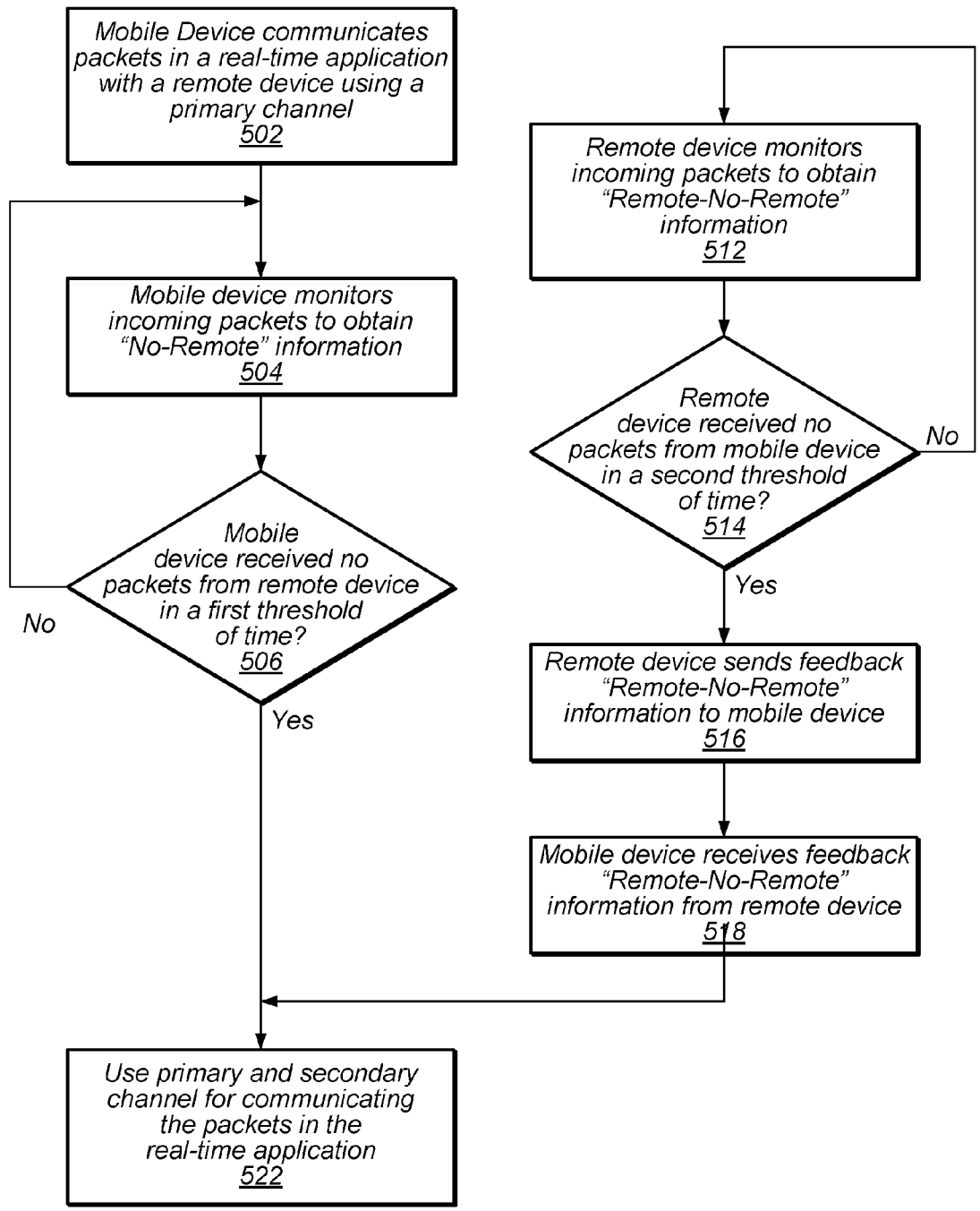
FIG. 5 is a flowchart diagram illustrating an exemplary method for using a plurality of channels for a real-time application, according to one embodiment.

FIG. 5—Using a Primary and Secondary Channel for a Real-Time Application

FIG. 5 is a flowchart diagram illustrating a method for using a primary and secondary channel for a real-time application. The method may be performed by a mobile device (such as mobile device 106) and a remote device. In the flowchart of FIG. 5, the mobile device 106 performs steps of 502, 504, 506, 518 and 522. The first and second channels may use two different RATs (e.g., WiFi and LTE, although other combinations are envisioned). The method shown in FIG. 5 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 502, the mobile device 106 communicates packets in a real time application with a remote device using a single primary channel. As discussed above, the real-time application may involve two way communication between the mobile device and a remote device, such as conferencing (e.g., videoconferencing), or may be largely unidirectional, such as streaming information to the mobile device, although feedback from the mobile device may still occur, but may generally involve substantially less feedback communication than the streaming information.

In general, the real-time application may involve audio and/or video packets being communicated either bidirectionally or unidirectionally, depending on the nature of the real-time application. Initially, the mobile device and remote device may communicate only using a primary communication channel. For example, the mobile device may use a first RAT, such as a WiFi RAT, for the primary communication channel.

While performing the real-time application, in 504 the mobile device 106 may monitor incoming packets to ensure that incoming packets are continually being received. Stated another way, the mobile device monitors incoming packets to obtain "No-Remote" information.

In 506 the mobile device determines if no packets have been received from the remote device for a first threshold of time. For example, the first threshold of time may be approximately three seconds, although other variations are envisioned. For example, the first threshold of time could be smaller (e.g., 2 seconds, 1 second, 500 milliseconds, 100 milliseconds, etc.) or larger (e.g., 4 seconds, 5 seconds, etc.) as desired. The determination in 506 may be used to determine the downlink channel quality of the mobile device and/or the uplink channel quality of the remote device.

If no packets have been received in the first threshold of time, the method may advance to 522. However, if packets have been received by the mobile device in the first threshold of time, the method may return to 504 and the mobile device may continue the monitoring of incoming packets. The mobile device may perform its determination periodically, such as every 5 seconds, 2 seconds, 1 second, 500 milliseconds, etc., as desired. Alternatively, the mobile device may perform this determination continuously.

In 512 the remote device may monitor its incoming packets as well to determine if no packets have been received by the remote device in a second threshold of time (i.e., to determine whether the remote device has received packets from the mobile device in the second threshold of time). When the remote device determines that packets have been received within the second threshold of time, operation returns to 512, and the remote device continues monitoring its received packets. The remote device may perform its determination periodically, such as every 5 seconds, 2 seconds, 1 second, 500 milliseconds, etc., as desired. Alternatively, the remote device may perform this determination continuously.

When the remote device determines that no packets have been received in 514, then in 516 the remote device sends feedback to the mobile device 106. This feedback indicates that no packets have been received by the remote device in the second threshold of time. This feedback information may be referred to as "remote-no-remote" information.

In 518, the mobile device receives the feedback from the remote device and hence determines that no packets have been received by the remote device in a second threshold of time. In response to receiving the feedback information from the remote device, the method advances to 522.

In 522 the mobile device begins using both the primary and secondary channel for communication of packets in the real-time application. Thus if either the mobile device 106 detects non-receipt of incoming packets for the first threshold of time, or the remote device detects non-receipt of incoming packets for the second threshold of time and alerts the mobile device, then the mobile device 106 begins using a secondary channel alongside the primary channel. Thus in 522, based on determining that no packets have been received 1) by the mobile device within the first threshold of time and/or 2) by the remote device within the second threshold of time, the mobile device and/or remote device may begin using two channels (the primary communication channel and a secondary communication channel) for communicating the packets of the real-time application. In various embodiments, the secondary communication channel may have already been established (e.g., during initial negotiation of channel set-up for the real-time application, such as approximately at the same time or soon after establishing the primary communication channel) or may be established in 522 in response to 506 and/or 514-518. If established in 522, the nature of the secondary channel may have already been negotiated or may be determined during the establishment, as desired.

The first and second thresholds may be the same or different, as desired. In one embodiment, the first threshold may be longer than the second threshold. For example, the second threshold may be approximately two seconds, although smaller (e.g., 1 second, 500 milliseconds, 100 milliseconds, etc.) or larger (e.g., 3 seconds, 4 seconds, etc.) values are also envisioned.

The mobile device may determine if no packets have been received by the remote device in a variety of manners. For example, as described above the remote device may send a message (feedback information) to the mobile device indicating that no packets have been received within the second threshold of time (e.g., using the primary communication channel and/or another channel, such as a signaling channel). As another possibility, the remote device may periodically send a message indicating the period of time since a last packet has been received and the mobile device may use that message to compare the reported time to the second threshold of time. Other methods of determining if no packets have been received by the remote device in the second threshold of time are also envisioned. Note that the mobile device may similarly transmit this information to the remote device (i.e., the two devices may implement symmetrical methods), as desired.

In one embodiment, using two channels for the real-time application may mean that substantially all packets (e.g., all audio and/or video packets) of the real-time application are transmitted over both the primary communication channel and the secondary communication channel. For example, in a videoconferencing application, the mobile device may transmit the same packets (e.g., comprising audio and/or video information of the videoconference) over both the primary communication channel and the secondary communication channel. As another possibility, the mobile device may encode the packets differently for each channel (e.g., where the audio and/or video packets are encoded according to a different codec, bit rate, and/or resolution), but the same audio and video information (albeit in different formats) is transmitted over both channels. Thus, the two channels may be used for redundant transmission in either an identical sense (i.e., the same packets are sent) or in a content sense (i.e., the same content is sent, but potentially in a different format). Thus, in either embodiment, in 508, the packets of the real-time application may be transmitted concurrently over the two channels, in a redundant fashion. Accordingly, in some embodiments, the secondary channel may be referred to as a redundant channel.

The method of FIG. 5 may also be extended to apply to more than two channels, as desired.

Figure 6:
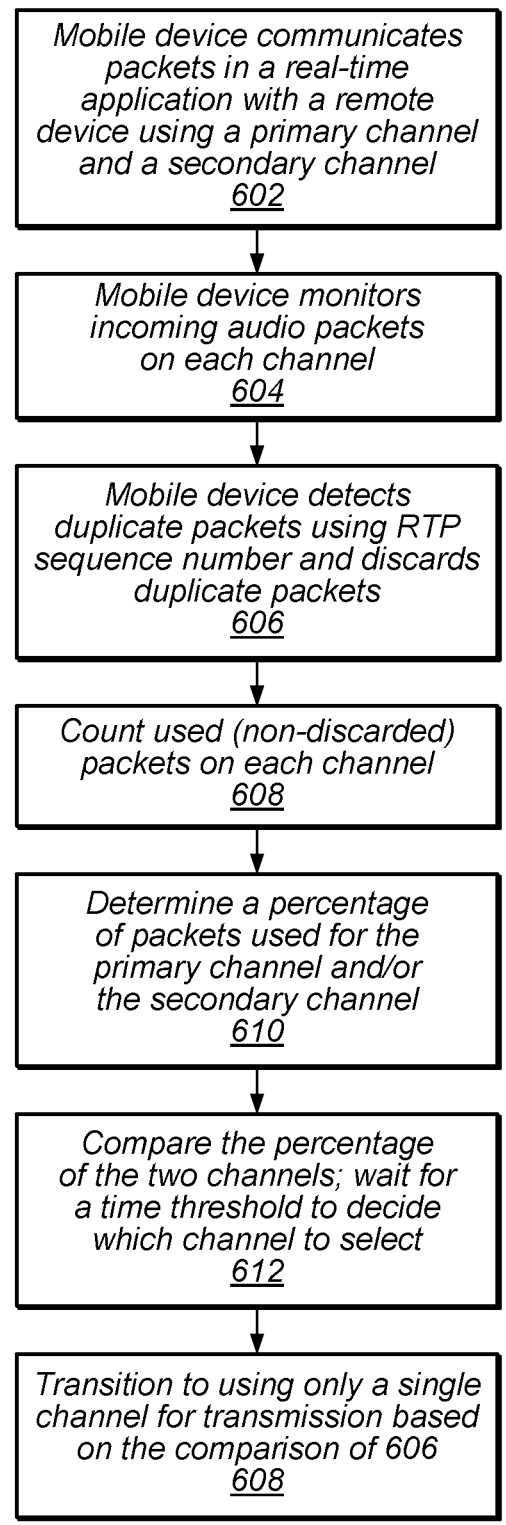
FIG. 6 is a flowchart diagram illustrating an exemplary method for transitioning from dual channel transmission to single channel transmission, according to one embodiment.

FIG. 6—Transitioning from Dual Channel to Single Channel Transmission

FIG. 6 is a flowchart diagram illustrating a method for transitioning from using a primary and secondary channel for a real-time application to using a single channel for the real-time application. The method may be performed by a mobile device (such as mobile device 106) and the first and second channels may use two different RATs (e.g., WiFi and LTE, although other combinations are envisioned). The method shown in FIG. 6 may be used in conjunction with any of the systems or devices shown in the above Figures, among other devices. For example, the method of FIG. 6 may be used in conjunction with the method of FIG. 5, e.g., for transitioning between dual channel and single channel transmissions. However, the methods of FIGS. 5 and 6 may also be used independently (e.g., where a different method is used for entering or exiting single channel or dual channel transmission modes). In various embodiments, some of the method elements shown may be performed concurrently, in a different order than shown, or may be omitted. Note also that additional method elements may also be performed as desired. The method may be performed as follows.

In 602, a real-time application may be performed or executed, similar to 502 above. However, in 602, the real-time application may use both a primary and a secondary channel for communicating the packets of the real-time application, e.g., in the manner described in 508 above.

In 604, a percentage of used packets for one or both of the primary and secondary channels may be determined. In particular, in 602, the mobile device may transmit and receive duplicates of the same packets (or same content, but transmitted according to a different format) of the real-time application using both the primary and secondary channels. On the receiving end, for a single packet, the mobile device may use whichever of the duplicate packets is successfully received first, from either channel. Thus, if the packet is successfully received over the primary channel before the secondary channel, the packet of the primary channel may be used (e.g., placed in the receiving buffer, e.g., the audio or video buffer) and the packet of the secondary channel may be discarded. When packets are not successfully received (e.g., they are lost due to poor channel quality), then they are clearly not used. Based on this procedure, the mobile device may maintain statistics for the percentage of packets that are used for each channel. For example, the mobile device may determine that 80% of the used packets come from the primary channel versus 20% from the secondary channel, e.g., based on keeping track of the packets on a packet-by-packet basis.

In 606, the determined percentage of 604 may be compared to a threshold. Additionally, in 608, if the determined percentage passes the threshold, the mobile device and remote device may transition from dual channel communication to single channel communication. For example, the method may transition from using both channels to using whichever channel exceeds the threshold. As a specific example, if the threshold is 75% and 80% of the packets from the primary channel are used, the method may transition to using the primary channel and cease using the secondary channel for communication. Similarly, if the threshold is 95% and 98% of the secondary channel packets are used, then the method may transition to only using the secondary channel (which may be upgraded to the primary channel) and may cease using the previous primary channel (which may now be the secondary channel or may be discarded entirely, e.g., if the channel has failed).

As another possibility, the threshold may be a lower threshold. For example, the method may disable use of a channel if the packets used form that channel fall below a threshold percentage, such as 5%, 10%, 20%, 25%, etc. Thus, if the channel's use rate is too low to be useful (e.g., most of the packets are not arriving, or the other channel is simply much faster or better), then that channel may be disabled, and the other channel may be used. For example, if only 6% of the packets from the secondary channel are used and the threshold is 10%, then the secondary channel may be disabled and the method may simply use the primary channel for communication, in a single channel mode.

While the steps above have been described from the mobile device's point of view, the same method may be performed by the remote device. In addition, the two devices may compare the results of their comparisons to thresholds and determine whether to transition to a single channel mode based on the results. For example, the method may only transition from dual channel transmission to single channel transmission if both devices agree that the transition should occur and also agree on the particular channel. Alternatively, the transition may occur if one of the devices determines that the transition should occur, and the other device does not have a reason to object (e.g., the other device may object if that channel is not sufficient, based on thresholds from its end). As an example, if the remote device indicates that the comparison indicates that the primary channel is sufficient and that dual channel transmission is no longer necessary, but the mobile device determines that it is only using 2% of the packets form the primary channel, it may override the decision from the remote device.

As discussed above, while the method of FIG. 6 may result from the transition from FIG. 5, other methods of transitioning from single channel transmission mode to dual channel transmission mode may be used, e.g., using different methods for determining channel degradation than those discussed in FIG. 5, such as packet loss ratios, round trip times, quality of service metrics, etc. Similarly, other methods than FIG. 6 may be used to transition from dual channel transmission mode to single channel transition mode, e.g., in combination with the method of FIG. 5, such as using quality of service metrics, packet loss ratios, round trip times, etc. Additionally, these other metrics may also be incorporated into the methods of FIGS. 5 and 6 as desired.

Finally, the method of FIG. 5 may also be extended to apply to more than two channels, as desired.

Modifying Settings Based on Changes in Channel Use

Video pipelines for real-time applications are usually optimized for user scenarios. For instance, a video conferencing application on a mobile device can have completely different camera capture settings, video codec, and network adaptation algorithms between different channels or RATs (e.g., between WiFi and cellular channels). Accordingly, when a video conferencing application switches transmission between two different connections (channels), embodiments may operate to dynamically select the video pipeline which is best suited for this connection type. The transition between different settings, such as camera settings, pipeline settings, etc., may be performed dynamically during operation and hence maybe be seamless without sacrificing user experience.

In some embodiments, network adaptation algorithms may be changed during the transition. As an example, when encoder setting switches, packets in the lower level queue are no longer useful, and may be flushed (e.g., from the transmission queue or buffer) which may save data usage for the sender and/or receiver. Additionally, during the transition period, incoming refresh frame requests may be ignored until the new I-frame is received by the receiver. As another example, when sending frames over both the primary and secondary channels, the amount of packets sent on the redundant channel, e.g., the cellular channel, may be reduced, e.g., to avoid data use or because the cellular channel cannot handle the data throughput as compared to the WiFi connection. For example, droppable frames, such as certain P-frames and/or B-frames may not be sent over a cellular channel, but may be sent over WiFi. In one embodiment, adaptation on different channels may be separate and each channel may use its own set of parameters.

Figure 7:
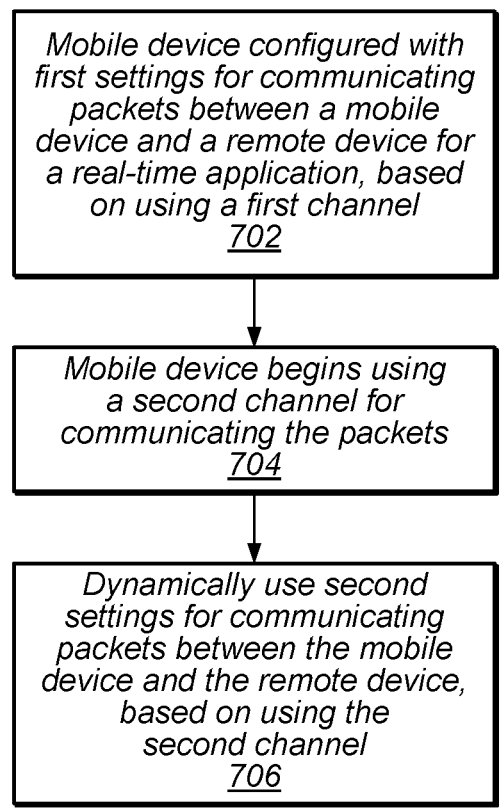
FIG. 7 is a flowchart diagram illustrating an exemplary method for modifying settings based on changes in channel transmission.

FIG. 7—Modifying Settings Based on Changes in Channel (s) for Transmission

FIG. 7 is a flowchart diagram illustrating a method for modifying settings based on changes in channel transmission. The method for modifying settings based on channel transmission changes may be performed dynamically or "on-the-fly" during operation. Thus, as one example, numerous such settings modifications may be performed during a session of a real-time application, as conditions warrant.

The method may be performed by a mobile device (such as mobile device 106) and may involve the use of first and second channels that may use two different RATs (e.g., WiFi and LTE, although other combinations are envisioned). The method shown in FIG. 7 may be used in conjunction with any of the systems or devices shown in the above Figures, among other devices. For example, the method of FIG. 7 may be used in conjunction with the methods of FIGS. 5 and 6. In various embodiments, some of the method elements shown may be performed concurrently, in a different order than shown, or may be omitted. Note also that additional method elements may also be performed as desired. The method may be performed as follows.

In 702, first settings may be used based on use of a first channel for communicating packets in a real-time application. The settings may be any of various ones related to capturing and transmitting the data for the real-time application. For example, in one embodiment, the real-time application may be a videoconference or more generally related to video data and the settings may relate to the format, bit rate, resolution, etc. of the video packets. As a specific example, for a videoconference, the settings may include camera capture settings (e.g., including resolution) used by the mobile device to capture images used for the videoconference. The settings may also relate to a type of video encoder used in encoding captured video for transmission during the real-time application.

In particular, in one embodiment, if the first channel uses a high bandwidth RAT and/or does not charge for increased data usage, higher quality (e.g., higher resolution, bit rate, etc.) settings may be used. For example, if the mobile device uses WiFi for the first channel, then high quality settings may be used. Alternatively, if the mobile device uses a RAT that cannot support the high quality settings and/or one that charges for increased data use (or where data use is generally desired to be kept low), lower quality (e.g., lower resolution, bit rate, etc.) settings may be used. For example, if the mobile device uses cellular communication for the first channel, then low quality settings may be used.

In some embodiments, the settings may be based only on the local link (e.g., the link from the mobile device to the network, such as WiFi or cellular) and may ignore the remote link. For example, high quality settings may be used if WiFi is used by the mobile device, ignoring whether the remote device uses WiFi or cellular. Alternatively, the settings may be based on both the local link and the remote link (e.g., based on the characteristics of the end-to-end channel). For example, if either device uses cellular, then the mobile device may use the low quality settings, e.g., even when the mobile device's local link is WiFi.

In 704, a second channel may be used for communicating the packets. In some embodiments, the second channel may be used concurrently with the first channel (e.g., in the redundant fashion discussed previously) or may be used instead of the first channel, depending on the embodiment. Note that the second channel may be used in response to initiation by the mobile device and/or by initiation by the remote device, as desired. Thus, the mobile device may cause the use of the second channel, or may determine that the second channel is being used by the remote device.

In 706, in response to using the second channel, second settings may be used. Similar to descriptions above, the settings for the second channel may be based on the local link (e.g., WiFi or cellular) or may be based on the overall link (e.g., if the remote device's local link has changed, even though the mobile device's has not).

Where the second channel is used as the only channel (i.e., not concurrently with the first channel), then the choice of settings may be similar to that described above for the first settings for the first channel. More specifically, in one embodiment, if the second channel uses a high bandwidth RAT and/or does not charge for increased data usage, higher quality (e.g., higher resolution, bit rate, etc.) settings may be used. For example, if the mobile device uses WiFi for the second channel, then high quality settings may be used. Alternatively, if the mobile device uses a RAT that cannot support the high quality settings and/or one that charges for increased data use (or where data use is generally desired to be kept low), lower quality (e.g., lower resolution, bit rate, etc.) settings may be used. For example, if the mobile device uses cellular communication for the second channel, then low quality settings may be used.

However, where the first and second channels are used concurrently, e.g., in a redundant fashion, the choice of settings may be affected. For example, in one embodiment, the same settings may be used for both the first and second channels (e.g., where the first and second channels share a same encoder). In this case, the choice of settings may need to be determined based on both channels, rather than only based on the second channel. For example, the single settings used for both may be based on the channel that has the lowest bandwidth or other constraints. As a specific example, if the single setting is based only on the mobile device's local links for the first and second channel (and therefore ignores the links of the remote device), the lowest settings associated with either the first or second channel may be used. For example, if the mobile device uses WiFi for the first channel (e.g., which normally would use a high quality setting) and cellular for the second channel (e.g., which normally would use a low quality setting), then the low quality setting may be used as the single setting (e.g., since the bandwidth of the cellular connection may not be supported, the data use on the cellular connection may be too high, etc.).

Similarly, if the single setting is based on the end-to-end characteristics of the channel, and therefore may be affected by the local link of the remote device, then the lowest quality setting may be used from all of the links. For example, if the mobile device uses WiFi for both the first and second channels, and the remote device uses WiFi for the first channel and cellular for the second channel, then the settings may be set based on the settings that would be used for the cellular link of the second channel of the remote device, e.g., since this setting would be the lowest of the others, e.g., based on bandwidth or data usage. Note that while the lowest setting is considered here, it is also possible that an average setting or highest setting may be used, in other embodiments.

When the setting is changed based on using the second channel, and where a single encoder is used, the encoder (e.g., where it is implemented in software) may be torn down and rebuilt for the second settings (e.g., which may be a different type of encoder, different bit rate, different format, different resolution, etc.). Additionally, the capture settings of the camera may be modified to reflect the changes, e.g., in resolution.

Where the first and second channels are used concurrently, but the setting is not shared across the first and second channels (e.g., where separate encoders are used for each channel), then the setting may be selected independently for each channel, e.g., similar to discussions above regarding the selection method for the first channel. When two different settings are used, the mobile device may implement two different encoders (e.g., software encoders) may be used, e.g., a high quality encoder and a low quality encoder, and each encoder may be associated with a respective channel of the first and second channels.

Figure 8:
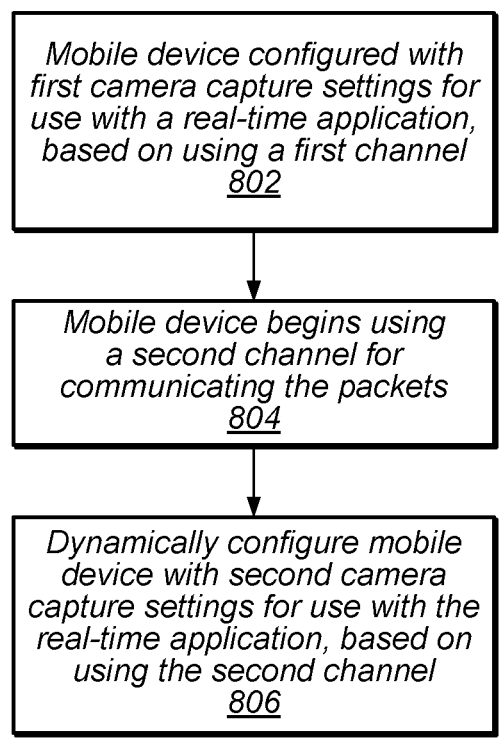
FIG. 8 is a flowchart diagram illustrating an exemplary method for dynamic modification of camera capture settings.

FIG. 8—Dynamic Modification of Camera Capture Settings

FIG. 8 is a flowchart diagram illustrating dynamic modification of camera capture settings in a mobile device based on changes in the communication channel(s) being used.

As shown, in 802 the mobile device is configured with first camera capture settings for use with a real-time application. The first camera capture settings may be based on the particular communication channel being used. For example, if the mobile device is using a high quality connection, such as a WiFi connection, the first camera capture settings may specify a higher resolution for acquired images. If the mobile device is using a lower quality connection, such as a cellular connection, the first camera capture settings may specify a lower resolution for acquired images.

In 804 the mobile device may begin using a second channel for communicating the packets. In some embodiments, the second channel may be used concurrently with the first channel (e.g., in the redundant fashion discussed previously) or may be used instead of the first channel, depending on the embodiment. Note that the second channel may be used in response to initiation by the mobile device and/or by initiation by the remote device, as desired. Thus, the mobile device may cause the use of the second channel, or may determine that the second channel is being used by the remote device.

In 806 the mobile device may dynamically configure its camera with second camera capture settings that replace the first camera capture settings. The mobile device dynamically configures its camera with second camera capture settings based on the change in using the second communication channel determined in 804. The second camera capture settings may have a different resolution for acquiring captured images than the resolution of the first camera capture settings. The various operations described in 706 of FIG. 7 may be performed here.

Thus, in one embodiment, camera capture settings may be updated based on local and/or remote party information. For example, if a local mobile device switches from transmitting on WiFi to transmitting through cellular, the resolution of the mobile device camera may be modified from a higher resolution to a lower resolution. When the mobile device switches from cellular to WiFi, the resolution of the mobile device camera may also be switched from the lower resolution to the higher resolution. Similarly, if the remote device switches from WiFi to cellular, the resolution of the local mobile device camera may be switched from the higher resolution to the lower resolution. Additionally, if the remote device switches from cellular to WiFi, the resolution of the local mobile device camera may be switched form the lower resolution to the higher resolution. The switching between different camera resolutions may occur dynamically or "on-the-fly" during operation of the mobile device in response to changing transmission characteristics of the mobile device as described above.

In some embodiments, the switching between resolution may be symmetric (where both the mobile device and the remote device change resolutions to higher or lower resolutions) or asymmetric (where each individual device elects to change its resolution independently). For example, for symmetric modifications, if both devices are on WiFi, then each device may use a higher resolution (either the same or different higher resolution, as desired). Then, if one device switches from WiFi to cellular, both devices may use a lower resolution (either the same or different lower resolution, as desired). For asymmetric modifications, on the other hand, if one device switches from WiFi to cellular, than that device may switch to the lower resolution, while the other device may maintain the higher resolution, since it is still using WiFi, as one example.

Figure 9:
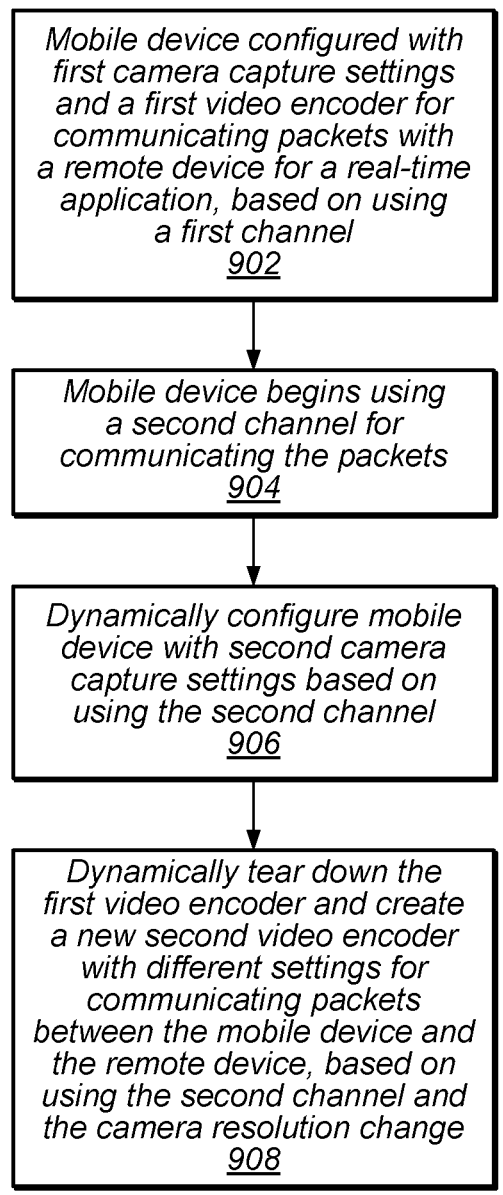
FIG. 9 is a flowchart diagram illustrating an exemplary method for dynamic modification of camera capture settings and video encoder.

FIG. 9—Dynamic Modification of Camera Capture Settings and Video Encoder

FIG. 9 is a flowchart diagram illustrating dynamic modification of camera capture settings and video encoder usage in a mobile device based on changes in the communication channel(s) being used.

As shown, in 902 the mobile device is configured with first camera capture settings and with a first video encoder for use with a real-time application. The first camera capture settings and first video encoder may be based on the particular communication channel being used. For example, if the mobile device is using a high quality connection, such as a WiFi connection, the first camera capture settings may specify a higher resolution for acquired images and the first video encoder may perform encoding presuming the presence of a high quality channel. If the mobile device is using a lower quality connection, such as a cellular connection, the first camera capture settings may specify a lower resolution for acquired images, and the first video encoder may perform encoding presuming the presence of a lower quality channel.

In 904 the mobile device may begin using a second channel for communicating the packets. In some embodiments, the second channel may be used concurrently with the first channel (e.g., in the redundant fashion discussed previously) or may be used instead of the first channel, depending on the embodiment. Note that the second channel may be used in response to initiation by the mobile device and/or by initiation by the remote device, as desired. Thus, the mobile device may cause the use of the second channel, or may determine that the second channel is being used by the remote device.

In 906 the mobile device may dynamically configure its camera with second camera capture settings that replace the first camera capture settings. The mobile device dynamically configures its camera with second camera capture settings based on the change in using the second communication channel determined in 904. The second camera capture settings may have a different resolution for acquiring captured images than the resolution of the first camera capture settings. Any of the operations described in 706 of FIG. 7 may be performed here.

In 908 the mobile device dynamically tears down the first video encoder and creates a new second video encoder with different settings. The new second video encoder is designed to encode images Thus, in one embodiment, both the camera capture settings and the video encoder in use may be updated based on local and/or remote party information. For example, if a local mobile device switches from transmitting on WiFi to transmitting through cellular, the resolution of the mobile device camera may be modified from a higher resolution to a lower resolution, and also a new video encoder may be created for use with this lower resolution. When the mobile device switches from cellular to WiFi, the resolution of the mobile device camera may also be switched from the lower resolution to the higher resolution, and the video encoder changed accordingly. Similarly, if the remote device switches from WiFi to cellular, the resolution of the local mobile device camera may be switched from the higher resolution to the lower resolution, and the video encoder changed accordingly. Additionally, if the remote device switches from cellular to WiFi, the resolution of the local mobile device camera may be switched form the lower resolution to the higher resolution, and the video encoder changed accordingly. The switching between different camera resolutions and/or different video encoders may occur dynamically or "on-the-fly" during operation of the mobile device in response to changing transmission characteristics of the mobile device as described above.

In each of the methods described herein, e.g., in each of FIGS. 7-9, the mobile device and/or the remote device may be configured to dynamically react to the change in settings of the other device. For example, when the mobile device modifies its settings based on using the second channel, the remote device may dynamically react to the change in settings in various different manners.

Figure 10:
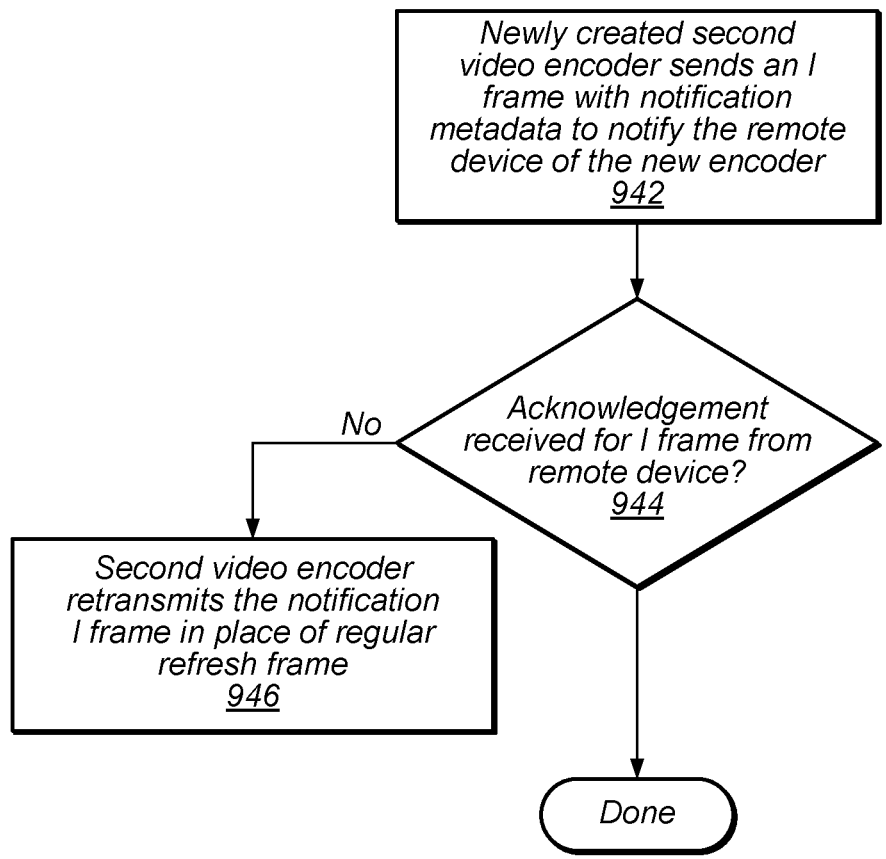
FIG. 10 is a flowchart diagram illustrating an exemplary method for using I frames to notify the remote device of changed settings.

FIG. 10—Use of I Frames to Notify the Remote Device of Changed Settings

In one embodiment, the mobile device may send a new I-frame to the remote device upon the change in settings, and the I-frame may include meta-data identifying the characteristics of the new setting being used (e.g., the resolution, encoder type, bit rate, etc.). The remote device may receive this I-frame and create or modify a decoder in order to adjust to the new settings.

In some cases, the I-frame may be missed by the remote device, and the mobile device may retransmit the I-frame (or a new I-frame) in response, e.g., based on receiving a message requesting an I-frame from the remote device. For example, as shown in FIG. 10 at 942 a newly created video encoder in the mobile device may transmit an I-frame to the remote device to notify the remote device of the new encoder. However, in some instances, this notification I-frame may get lost in the network or otherwise is not received by the remote device. For example, at 944 the mobile device determines if an acknowledgement has been received for this I frame. If an acknowledgement has been received for this I frame, then operation completes. If the mobile device has not received an acknowledgement for this "notification" I frame within a certain time period, the new encoder operates to retransmit this notification I-frame instead of a regular refresh frame, such as a P or B frame. In this instance, if the I frame was not received by the receiver then the receiver will not be informed that the encoder settings have changed. Thus a retransmission of this notification I-frame is warranted.

As another possibility, when a new video setting is selected, a new I-frame may be generated by the video encoder with different coding parameters, such as picture width, height, etc. When the receiver receives this new I-frame, it may detect this setting change and handle it correctly. However, when this new I-frame is lost or not received by the receiver, the receiver may receive later P-frames coded by the new encoder. Because the receiver is still using the old settings, it will not be able to decode these new P-frames. Accordingly, an decoder error may be generated, and the receiver may send out a message, e.g., a request to the sender asking for a new "Refresh" frame using a request, e.g., a Full Intra-request (FIR) in RTCP. Once the sender receives the request, it may typically send out Intra-P frame in normal implementation (e.g., because an Intra-P frame is normally smaller than a new I-frame). However, in the case of a change in settings, the sender may determine that the coding parameters of the request and determine if they match the current settings. If the parameters do match, then the sender may generate and transmit an Intra-P frame in response to the request. However, if the parameters do not match, then the sender may generate and transmit a new I-frame (with the new settings) to the receiver. This embodiment may not require a change to existing receiver behavior and may therefore be back-ward compatible.

Additionally, or alternatively, the mobile device may send a separate message identifying the change in settings. As a further possibility, the two devices may independently be aware of the use of the second channel and may both choose a same new setting based on the use of the second channel (e.g., based on pre-stored or pre-arranged associations of settings with channels or channel types). Accordingly, both devices may already know what the new setting will be and no substantive communication of that new setting may be necessary. Note that while these descriptions are discussed from the point of view of the mobile device to the remote device, the mobile device may also implement the same functionality for changes in settings from the remote device to the mobile device.

Therefore, in summary, in switching between resolutions, camera settings, bit rates, resolution, codecs, the mobile device may use a single video codec instance to handle the change. For example, the mobile device may execute a single video encoder, and when a camera setting change occurs, it may tear down the encoder and recreate a new one with different settings. The mobile device may send an I frame encoded with metadata ("notification" I frame) to notify the receiver decoder of the new video encoder in the mobile device. Thus, when a sender encoder generates a new "notification" I-frame and transmits it, when the receiver receives the new I-frame, the receiving device may change its decoder to the new settings. However, when the I-frame from the newly created encoder is lost or otherwise not received by the receiver device, the receiver will not be aware that the encoder has changed, and hence its decoder will not be adjusted accordingly. When this happens, the sender may be configured to retransmit the I-frame instead of a regular refresh frame, e.g., during a settings changeover or in response to a request from the receiver.

When a mobile device uses a single encoder on conjunction with multiple communication channels, as discussed in the previous Figures, the sender may send the same frames or packets (i.e., with the same resolutions or formats) across both channels. Accordingly, either packet from either channel can be provided to the receiver's decoder interchangeably. Thus packets provided by the single encoder can be provided on to either channel, and can be fed to the decoder in an interchangeable fashion. In other words, some packets received on the primary communication channel can be fed to the receiver decoder, followed by packets received on the secondary communication channel being fed to the receiver decoder, and so on.

However, while using a single encoder instance (which is dynamically torn down and a new one created in its place as needed) may be simple to implement, it may have some limitations. Instead, multiple encoder instances may be desirable, depending on the implementation (e.g., for transition speed, efficiency, data use, etc.). In this embodiment, the sender may implement two encoders with different settings, which may be selected based on respective channels (e.g., WiFi or cellular). The two encoders may be the same codec (e.g., H.264) but with different settings or may be two different codecs (e.g., H.264 and HEVC), as desired. The multiple video codec instances may be based on the respective communication channel, e.g., a first video codec instance may be tailored to the primary channel and a second video codec instance may be tailored to the secondary channel. For example, the mobile device may have two different H.264 video encoder instances with different video settings for reach respective channel. The sending device may select which of the video encoder instances to used based on the current connection that is being used.

When using multiple channels, as discussed in the previous Figures, using multiple encoders may mean that packets or frames from the sender cannot be used interchangeably, resulting in less redundancy and more overhead. However, it is also possible that the decoder(s) could be configured to use scalable video coding (SVC) or generally use packets or frames from each channel, e.g., where that packet or frame is not available on one of the channels. For example, the various frames may be decoded by either a single decoder or two different decoders and then combined for video display after decoding.

Scalable video coding (SVC) may require configuration of both the encoder (on the transmitting device) and the decoder (on the receiving device) for proper operation. It is noted that SVC may not require two decoders. For example, a single SVC decoder can decode multiple layers of the SVC bitstream. An example of using SVC in this case is that data is concurrently transmitted on both channels, the video can be coded using two layers (a base layer and an enhancement layer). The enhancement layer is used to encode the additional video resolution, frame rate or quality on top of the base layer. Then the base layer may be transmitted on only one channel (e.g., the cellular channel), and both the base layer and the enhancement layer may be transmitted on the other channel (WiFi). When the decoder receives base layer packets from either channel, it can reconstruct the video quality of the base layer. When the decoder also receives all or part of the enhancement layer, it can reconstruct the higher quality frames.

Figure 11:
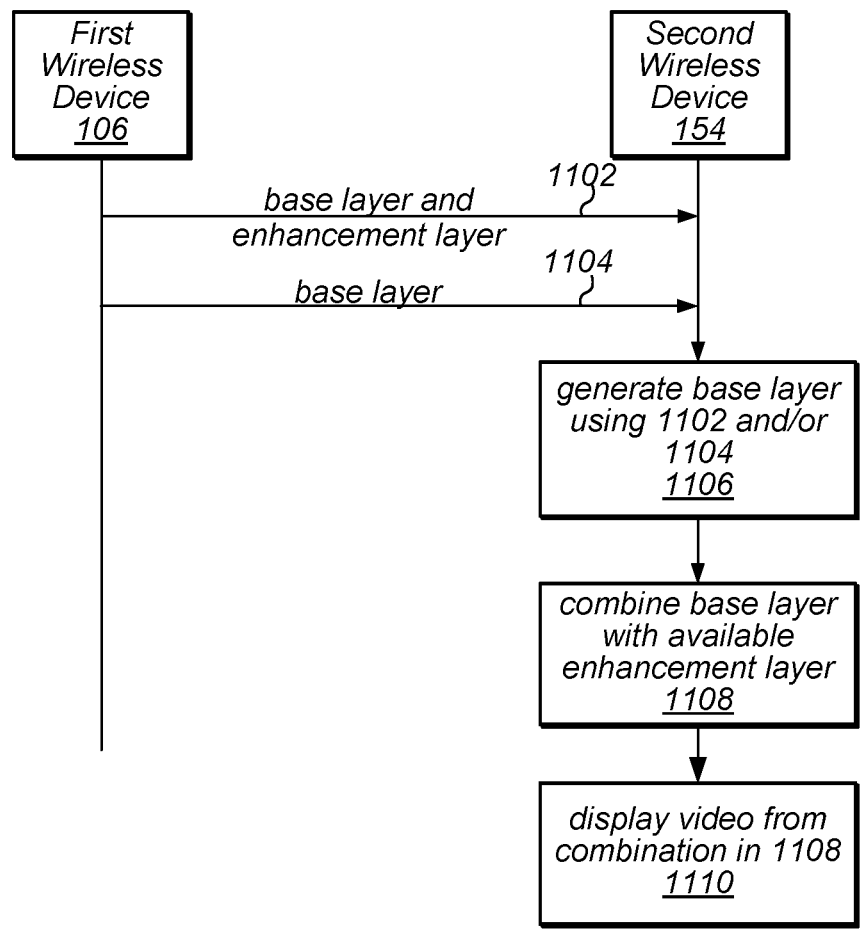
FIG. 11 is a flowchart diagram illustrating an exemplary method for transmitting different amounts of data over primary and secondary channels.

FIG. 11 illustrates an exemplary embodiment where different amounts of data are sent over each channel. In particular, the base layer and enhancement layer of the video may be transmitted from the first wireless device 106 to the second wireless device 154 over the primary channel in 1102. Concurrently, the same base layer may be transmitted over the secondary channel in 1104. The second wireless device 154 may generate the base layer using the transmissions of 1102 and 1104. For example, where a base layer packet was successfully transmitted via the primary channel in 1102, but was not successfully transmitted via the secondary channel in 1104, the second wireless devices 154 may use the successfully transmitted base layer packet from the primary channel. Similarly, where a base layer packet was not successfully transmitted via the primary channel in 1102, but was successfully transmitted via the secondary channel in 1104, the second wireless device 154 may use the base layer packet from the secondary channel. Thus, the base layer packets may be redundantly transmitted over both channels and the second wireless device may generate the base layer using successfully received packets from either channel, as desired. In 1108, the second wireless device 154 may combine or enhance the base layer with available enhancement layer packets. For example, where both a base layer frame and a corresponding enhancement layer frame are successfully received, the second wireless device 154 may enhance the base layer frame with the enhancement information to generate a higher quality frame (e.g., higher resolution0 than would be available by simply using the base layer frame. Alternatively, or additionally, the enhancement layer frame may provide more intermediary frames or intermediary information to provide a higher quality video experience. The enhancement layer information may be used opportunistically, where the enhancement information is successfully received in 1102. Accordingly, the resulting video may be displayed in 1110.

Therefore, when sending packets over both channels, the amount of packets or data sent over one of the channels (e.g., the cellular channel or redundant channel) may be reduced. Note that while both the base layer and the enhancement layer are shown as sent over the primary channel, it is possible that they might be sent over the secondary channel and the primary channel may only send the base layer. For example, if the primary channel includes a cellular connection and the secondary channel does not include a cellular connection, the primary channel may not send the enhancement layer to avoid using too much of the user's data, while the secondary channel (e.g., which may use WiFi), may transmit both the base layer and the enhancement layer.

In one embodiment, frames may be partitioned into "non-droppable" frames, such as I frames and possibly certain P frames, and droppable such as B-frames and certain (or all) P-frames. Both non-droppable and droppable frames may be sent over one channel (e.g., the primary channel or WiFi channel). Thus all of the I, P and B frames may be sent over the primary channel. The secondary channel (e.g., the redundant channel or cellular channel) may transmit only the non-droppable frames only and does not transmit the droppable frames. In other words, the secondary channel may transmit only the I frames and perhaps certain P frames, and does not transmit frames that can be dropped without seriously impacting image quality. In some embodiments, the adaptation or manner that information is sent may be independent for each channel, e.g., each having its own set of parameters, as desired.

In one embodiment, a single encoding session is used wherein the encoder generates one bitstream with a portion of the bitstream comprising non-droppable frames and a second portion of the bitstream comprising droppable frames. The mobile device can then decide on how many of the droppable frames are transmitted on each channel. For example, the mobile device can transmit all of the non-droppable frames and a large percentage, or all, of the droppable frames on the primary (high quality) channel. The mobile device can then transmit all of the non-droppable frames and a smaller percentage, or none, of the droppable frames on the secondary (lower quality) channel.

Figure 12:
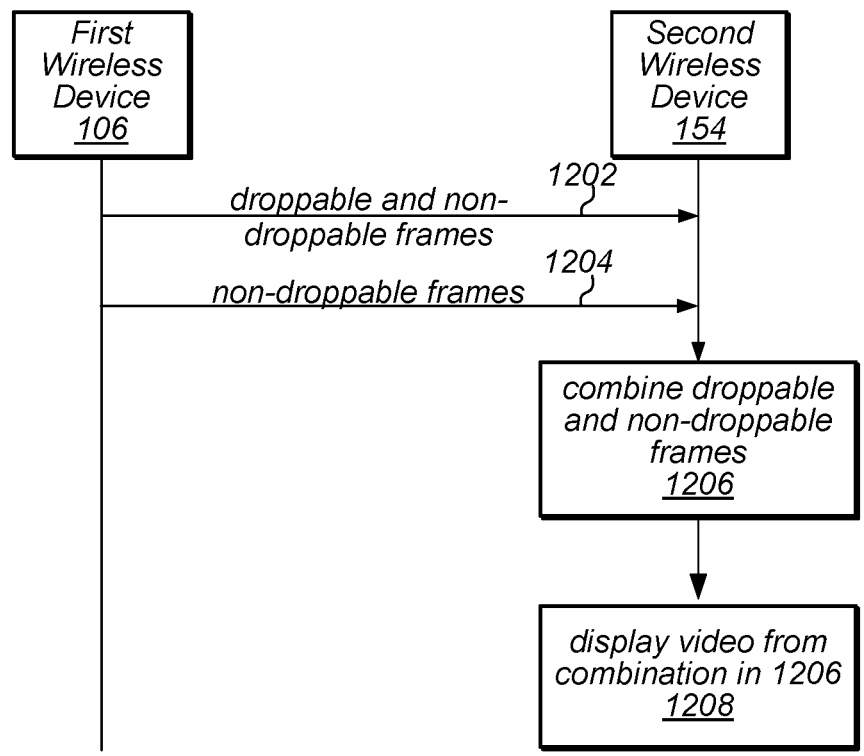
FIG. 12 is a flowchart diagram illustrating an exemplary method for transmitting varying amounts of droppable frames over primary and secondary channels.

FIG. 12 illustrates an exemplary embodiment where droppable frames are sent over the primary channel and only the non-droppable frames are sent over the secondary channel, although portions of the droppable frames are also envisioned for the secondary channel. In the embodiment shown, the first wireless device 106 may send both droppable and non-droppable frames of a video over the primary channel in 1202. Concurrently, the first wireless device 106 may transmit only the non-droppable frames over the secondary channel in 1204. For example, all I, P, and B frames may be transmitted in 1202; however, B frames (and/or possibly certain P frames, as determined by the first wireless device 106) may not be transmitted in 1204, allowing for lower transmission of data over the secondary channel. In 1206, similar to 1108 above, the second wireless device 154 may opportunistically combine the droppable and non-droppable frames. For example, where an I frame is successfully transmitted over the first channel in transmission 1202, but is not successfully transmitted over the second channel in transmission 1204, the second wireless device 154 may use the successfully received I frame from the transmission 1202. Conversely, where an I frame is not successfully transmitted over the first channel in transmission 1202, but is successfully transmitted over the second channel in transmission 1204, the second wireless device 154 may use the successfully received I frame from the transmission 1202. Since the droppable frames are only sent over the primary channel, in this case, the second wireless device 154 may insert the droppable frames at their appropriate positions in the video stream when they are successfully received. After combining these droppable and non-droppable frames, the video from the combination may be displayed in 1208.

Therefore, when sending packets over both channels, the amount of packets or data sent over one of the channels (e.g., the cellular channel or redundant channel) may be reduced. Note that while both the droppable and non-droppable frames are shown as sent over the primary channel, it is possible that they might be sent over the secondary channel and the primary channel may only send the non-droppable frames. For example, if the primary channel includes a cellular connection and the secondary channel does not include a cellular connection, the primary channel may not send the droppable frames to avoid using too much of the user's data, while the secondary channel (e.g., which may use WiFi), may transmit both the droppable and non-droppable frames.

During the transition period for the changing settings, various network adaptation algorithms may be used. For example, during a change of settings, data associated with the prior settings may no longer be necessary. Specifically, buffered data for the previous settings may be discarded (e.g., the encoded data to be transmitted, which may save data usage, and/or the received encoded data, if the decoder has already been replaced). Additionally, incoming requests (e.g., from the receiving device) to provide new information (e.g., incoming refresh frame requests) may be ignored until the settings have been changed (e.g., the new I-frame of the new setting has been received by the receiving device), since such data will soon be out of date.

Specific Embodiments

The following numbered paragraphs describe specific embodiments that do not limit the descriptions provided herein.

1. A method for performing a real-time application on a mobile device, wherein the real-time application communicates audio/video packets with a remote device, the method comprising, at the mobile device: communicating the audio/video packets on a first communication channel with the remote device; determining if no packets have been received by the mobile device from the remote device for a first threshold period of time, wherein said determining measures downlink channel quality of the mobile device; if no packets have been received by the mobile device from the remote device for the first threshold period of time, establishing a second communication channel for transmission of the audio/video packets with the remote device.

2. The method of any of the preceding paragraphs, further comprising: determining if a message is received from the remote device indicating that no packets have been received by the remote device from the mobile device for a second threshold period of time, wherein said determining measures uplink channel quality of the mobile device; if a message is received from the remote device indicating that no packets have been received by the remote device from the mobile device for the second threshold period of time, establishing the second communication channel for transmission of the audio/video packets with the remote device.

3. The method of any of the preceding paragraphs, wherein the first threshold period of time is longer than the second threshold period of time.

4. The method of any of the preceding paragraphs, further comprising: after said establishing the second communication channel, communicating the audio/video packets on the second communication channel concurrently with said communicating the audio/video packets on the first communication channel.

5. The method of any of the preceding paragraphs, further comprising: measuring a percentage of audio/video packets received on the first channel that are used in audio/video playback by an audio/video decoder in the mobile device, wherein said measuring is performed during said communicating the audio/video packets concurrently on the first and second communication channels; disabling transmission of the audio/video packets over the second channel if the percentage of received audio/video packets on the first channel that are used in audio/video playback is above a first threshold.

6. The method of any of the preceding paragraphs, further comprising: if the percentage of audio/video packets received on the first channel that are used in audio/video playback is below a second threshold, performing transmission of the audio/video packets exclusively on the second channel.

7. The method of any of the preceding paragraphs, further comprising: measuring a percentage of audio/video packets received on the second channel that are used in audio/video playback by an audio/video decoder in the mobile device, wherein said measuring is performed during said communicating the audio/video packets concurrently on the first and second communication channels; disabling transmission of the audio/video packets over the first channel if the percentage of received audio/video packets on the second channel that are used in audio/video playback is above a first threshold.

8. The method of any of the preceding paragraphs, further comprising: measuring a first percentage of audio/video packets received on the first channel and a second percentage of audio/video packets received on the second channel that are used in audio/video playback by an audio/video decoder in the mobile device, wherein said measuring is performed during said communicating the audio/video packets concurrently on the first and second communication channels; disabling transmission of the audio/video packets over one of the first channel or the second channel based on the first percentage and the second percentage.

9. The method of any of the preceding paragraphs, wherein the first communication channel uses a Wireless LAN (local area network) radio access technology (RAT), and wherein the second communication channel uses a cellular RAT.

10. The method of any of the preceding paragraphs, wherein the first channel comprises a primary communication channel and wherein the second channel comprises a redundant communication channel.

11. A mobile device configured to perform a real-time application, wherein the real-time application communicates audio/video packets with a remote device, the mobile device comprising: at least one antenna; at least one radio coupled to the at least one antenna, wherein the at least one radio is configured to perform communication using a first radio access technology (RAT) and a second RAT and maintain a connection to both the first RAT and the second RAT concurrently; and one or more processors coupled to the first radio, wherein the one or more processors and the first radio are configured to: communicate the audio/video packets on a first communication channel with the remote device; determine one or more of: 1) if no packets have been received by the mobile device from the remote device for a first threshold period of time, wherein said determining measures downlink channel quality of the mobile device; or 2) if a message is received from the remote device indicating that no packets have been received by the remote device from the mobile device for a second threshold period of time, wherein said determining measures uplink channel quality of the mobile device; if either 1) or 2) are determined to have occurred, establish a second communication channel for transmission of the audio/video packets with the remote device.

12. The mobile device of any of the preceding paragraphs, wherein the first threshold period of time is longer than the second threshold period of time.

13. The mobile device of any of the preceding paragraphs, wherein the one or more processors and the first radio are further configured to: after establishment of the second communication channel, communicate the audio/video packets on the second communication channel concurrently with communication of the audio/video packets on the first communication channel.

14. The mobile device of any of the preceding paragraphs, wherein the one or more processors and the first radio are further configured to: measure a percentage of audio/video packets received on the first channel that are used in audio/video playback by an audio/video decoder in the mobile device, wherein said measuring is performed during said communicating the audio/video packets concurrently on the first and second communication channels; disable transmission of the audio/video packets over the second channel if the percentage of received audio/video packets on the first channel that are used in audio/video playback is above a first threshold.

15. The mobile device of any of the preceding paragraphs, wherein the one or more processors and the first radio are further configured to: if the percentage of audio/video packets received on the first channel that are used in audio/video playback is below a second threshold, perform transmission of the audio/video packets exclusively on the second channel.

16. A non-transitory computer accessible memory medium comprising program instructions for controlling operation of a mobile device, wherein the mobile device is configured to perform a real-time application, wherein the real-time application communicates audio/video packets with a remote device, wherein the program instructions are executable to implement: communicating the audio/video packets on a first communication channel with the remote device; determining if no packets have been received by the mobile device from the remote device for a first threshold period of time, wherein said determining measures downlink channel quality of the mobile device; if no packets have been received by the mobile device from the remote device for the first threshold period of time, establishing a second communication channel for transmission of the audio/video packets with the remote device.

17. The non-transitory computer accessible memory medium of any of the preceding paragraphs, wherein the program instructions are further executable to implement: determining if a message is received from the remote device indicating that no packets have been received by the remote device from the mobile device for a second threshold period of time, wherein said determining measures uplink channel quality of the mobile device; if a message is received from the remote device indicating that no packets have been received by the remote device from the mobile device for the second threshold period of time, establishing the second communication channel for transmission of the audio/video packets with the remote device.

18. The non-transitory computer accessible memory medium of any of the preceding paragraphs, wherein the program instructions are further executable to implement: after establishing the second communication channel, communicating the audio/video packets on the second communication channel concurrently with said communicating the audio/video packets on the first communication channel; measuring a percentage of audio/video packets received on the first channel that are used in audio/video playback by an audio/video decoder in the mobile device, wherein said measuring is performed during said communicating the audio/video packets concurrently on the first and second communication channels; and disabling transmission of the audio/video packets over the second channel if the percentage of received audio/video packets on the first channel that are used in audio/video playback is above a first threshold.

19. The non-transitory computer accessible memory medium of any of the preceding paragraphs, wherein the program instructions are further executable to implement: if the percentage of audio/video packets received on the first channel that are used in audio/video playback is below a second threshold, performing transmission of the audio/video packets exclusively on the second channel.

20. The non-transitory computer accessible memory medium of any of the preceding paragraphs, wherein the first communication channel uses a Wireless LAN (local area network) radio access technology (RAT), and wherein the second communication channel uses a cellular RAT.

1. A method for performing a real-time application on a mobile device, wherein the real-time application generates audio/video packets, the method comprising: at the mobile device: communicating the audio/video packets on a first communication channel; communicating the audio/video packets on a second communication channel concurrently with said communicating the audio/video packets on the first communication channel; measuring a percentage of received audio/video packets on the first channel that are used in audio/video playback by an audio/video decoder in the mobile device, wherein said measuring is performed during said communicating the audio/video packets concurrently on the first and second communication channels; disabling transmission of the audio/video packets over the second channel if the percentage of received audio/video packets that are used in audio/video playback is above a first threshold.

2. The method of any of the preceding paragraphs, further comprising: performing transmission of the audio/video packets exclusively on the second channel, if the percentage of received audio/video packets that are used in audio/video playback is below a second threshold.

3. The method of any of the preceding paragraphs, further comprising: determining degradation in the first communication channel; wherein said communicating the audio/video packets on the second communication channel concurrently with the first communication channel is performed in response to determined degradation in the first communication channel.

4. The method of any of the preceding paragraphs, wherein said determining degradation in the first communication channel comprises: measuring link quality for local uplink or remote downlink on the first communication channel; and measuring link quality for local downlink or remote uplink on the first communication channel 5. The method of any of the preceding paragraphs, wherein the mobile device communicates with a remote device, the method further comprising: determining if no packets have been received by the mobile device from the remote device for a first threshold period of time, wherein said determining measures downlink channel quality of the mobile device; if no packets have been received by the mobile device from the remote device for the first threshold period of time, establishing the second communication channel for transmission of the audio/video packets with the remote device.

6. The method of any of the preceding paragraphs, wherein the first communication channel is a primary communication channel; wherein the second communication channel is a redundant communication channel.

7. The method of any of the preceding paragraphs, wherein the first communication channel is one of a WiFi communication channel or a cellular communication channel; wherein the second communication channel is the other of the wireless LAN communication channel or the cellular communication channel.

1. A method for conducting a real time application on a mobile device, the method comprising: at the mobile device: capturing first images from a camera of the mobile device using first camera capture settings having a first resolution; communicating first multimedia packets on a first communication channel during a video session, wherein the first multimedia packets correspond to the first images captured from the camera using the first camera capture settings having the first resolution; in response to transitioning to communication of multimedia packets on a second communication channel during the video session, changing the camera capture settings of the camera to second camera capture settings having a second resolution, wherein the second communication channel is a different bandwidth channel than the first communication channel, wherein the second resolution is different than the first resolution; and communicating second multimedia packets on the second communication channel during the video session, wherein the second multimedia packets correspond to the second images captured from the camera using the second camera capture settings having the second resolution.

2. The method of any of the preceding paragraphs, wherein the mobile device communicates with a remote device, the method further comprising: determining that the remote device has transitioned from generating multimedia packets on the first communication channel to generating multimedia packets on the second communication channel during the video session; in response to said determining that the remote device has transitioned during the video session, changing the camera capture settings of the camera to the second camera capture settings having the second resolution.

3. The method of any of the preceding paragraphs, wherein the mobile device uses an encoder, the method further comprising: in response to said changing the camera capture settings of the camera to the second camera capture settings having the second resolution, the mobile device modifying the encoder with different settings based on the changed resolution during the video session.

4. The method of any of the preceding paragraphs, wherein the mobile device communicates with a remote device; the method further comprising: after said modifying the encoder with different settings based on the changed resolution, transmitting, by the mobile device, an intra frame on the second communication channel in response to said transitioning, wherein the intra frame transmitted by the modified encoder comprises metadata useable by the remote device to change settings of a video decoder of the remote device.

5. The method of any of the preceding paragraphs, further comprising: determining that the intra frame transmitted on the second communication channel in response to said transitioning was not received by the remote device; retransmitting the intra frame on the second communication channel in response to said determining that the intra frame was not received by the remote device.

6. The method of any of the preceding paragraphs, further comprising: during a transition period of said modifying the encoder with different settings, ignoring refresh frame requests until the intra frame transmitted on the second communication channel is determined to have been received by the remote device.

7. The method of any of the preceding paragraphs, further comprising: during said communicating the first multimedia packets on the first communication channel, maintaining packets in a first queue usable by the video encoder; in response to the mobile device modifying the encoder with different settings, flushing the packets from the first queue.

8. The method of any of the preceding paragraphs, wherein the first communication channel is a higher bandwidth channel than the second communication channel, wherein the first resolution is a higher resolution than the second resolution.

9. The method of any of the preceding paragraphs, wherein the first communication channel is WiFi, and wherein the second communication channel is cellular.

10. The method of any of the preceding paragraphs, wherein changing the camera settings is performed in an asymmetric manner, with respect to a remote device.

11. A mobile device configured to perform a real-time application, wherein the real-time application communicates audio/video packets with a remote device, the mobile device comprising: a camera configured to capture images for the real-time application; at least one antenna; at least one radio, wherein the at least one radio is configured to perform communication a first channel and a second channel; and one or more processors coupled to the first radio, wherein the one or more processors and the first radio are configured to: communicate first multimedia packets on a first communication channel during a video session, wherein the first multimedia packets use first video settings associated with the first communication channel; in response to transitioning to communication of multimedia packets on a second communication channel during the video session, change the first video settings to second video settings for the second communication channel, wherein the second communication channel is a different bandwidth channel than the first communication channel; and communicate second multimedia packets on the second communication channel during the video session, wherein the second multimedia packets use the second video settings associated with the second communication channel.

12. The mobile device of any of the preceding paragraphs, wherein communication of the second multimedia packets on the second communication channel is performed concurrently with communication of the first multimedia packets on the first communication channel.

13. The mobile device of any of the preceding paragraphs, wherein the mobile device uses an encoder for the multimedia packets, wherein one or more processors are further configured to: modify the encoder with the first or second video settings based on whether the mobile device is currently communicating on the first or second communication channel.

14. The mobile device of any of the preceding paragraphs, wherein the first communication channel is a higher bandwidth channel than the second communication channel, wherein the video encoder is configured with first settings for generation of higher resolution images when the mobile device is communicating on the first communication channel, and wherein the video encoder is configured with second settings for generation of lower resolution images when the mobile device is communicating on the second communication channel.

15. The mobile device of any of the preceding paragraphs, wherein the first communication channel is a higher bandwidth channel than the second communication channel and wherein a lesser number of packets are transmitted on the second communication channel than the first communication channel.

16. The mobile device of any of the preceding paragraphs, wherein when the mobile device is communicating on the first communication channel, the mobile device is configured to generate a first number of video frames on the first communication channel, wherein the first number of video frames includes non-droppable frames and droppable frames, wherein when the mobile device is communicating on the second communication channel, the mobile device is configured to generate droppable frames and a lesser number of non-droppable frames on the second communication channel.

17. The mobile device of any of the preceding paragraphs, wherein the first communication channel is a higher bandwidth channel than the second communication channel, and wherein the first video settings specify a first resolution that is a higher resolution than a second resolution specified by the second video settings.

18. The mobile device of any of the preceding paragraphs, wherein the first communication channel is WiFi, and wherein the second communication channel is cellular.

19. The mobile device of any of the preceding paragraphs, wherein the mobile device uses a first video encoder and a second video encoder, wherein the first video encoder is used for communication on the first communication channel, and wherein the second video encoder is used for communication on the second communication channel, wherein the first communication channel is a higher bandwidth channel than the second communication channel, wherein the first video encoder is configured with the first video settings specifying generation of higher resolution frames, and wherein the second video encoder is configured with the second video settings specifying generation of lower resolution frames.

20. A method for conducting a real time application on a mobile device, the method comprising: at the mobile device: capturing first images from a camera of the mobile device using first camera capture settings having a first resolution; communicating first multimedia packets on a first communication channel, wherein the first multimedia packets correspond to the first images captured from the camera using the first camera capture settings having the first resolution; determining that the remote device has transitioned from generating multimedia packets on the first communication channel to generating multimedia packets on a second communication channel, wherein the second communication channel is a different bandwidth channel than the first communication channel; in response to said determining that the remote device has transitioned, changing the camera capture settings of the camera to second camera capture settings having a second resolution, wherein the second resolution is different than the first resolution.

21. A method for conducting a real time application on a mobile device, the method comprising: at the mobile device: determining connection characteristics of a first communication channel; selecting a first video encoder from a plurality of possible video encoders based on the determined connection characteristics of the first communication channel; communicating multimedia packets on the first communication channel, wherein said communicating multimedia packets on the first communication channel is performed using the first encoder of the mobile device; determining connection characteristics of a second communication channel; selecting a second video encoder from a plurality of possible video encoders based on the determined connection characteristics of the second communication channel; communicating multimedia packets on the second communication channel, wherein said communicating multimedia packets on the first communication channel is performed using the second encoder of the mobile device.

22. The method of any of the preceding paragraphs, wherein said communicating multimedia packets on the first communication channel and said communicating multimedia packets on the second communication channel are performed for the same multimedia session (or are performed concurrently)

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a mobile device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for conducting a real time application on a mobile device, the apparatus comprising:
one or more processing elements, wherein the one or more processing elements are configured to:
capture first images from a camera of the mobile device as part of the real time application;
communicate first multimedia packets on a first communication channel, wherein at least some of the first multimedia packets correspond to the first images captured from the camera, wherein the first communication channel is used for communication between the mobile device and a remote device, wherein communicating the first multimedia packets on the first communication channel comprises using a first radio access technology (RAT), and wherein while communicating on the first communication channel, first encoding settings, specifying a first codec, are used for the first multimedia packets of the real time application;
capture second images from the camera of the mobile device as part of the real time application; and
communicate second multimedia packets on a second communication channel using a second RAT, wherein at least some of the second multimedia packets correspond to the second images captured from the camera, wherein while communicating on the second communication channel, second encoding settings, specifying a second codec, used for the second multimedia packets of the real time application instead of the first encoding settings, wherein using the second encoding settings instead of the first encoding settings is performed based on using the second RAT.

2. The apparatus of claim 1, wherein communicating the first multimedia packets on the first communication channel comprises the mobile device transmitting and receiving the first multimedia packets over a first local link that uses the first RAT, wherein communicating the second multimedia packets on the second communication channel comprises the mobile device transmitting and receiving the second multimedia packets over a second local link that uses the second RAT, wherein using the second encoding settings instead of the first encoding settings is performed based on the mobile device communicating over the second local link that uses the second RAT.

3. The apparatus of claim 1, wherein communicating the first multimedia packets on the first communication channel comprises the remote device transmitting and receiving the first multimedia packets over a first remote link that uses the first RAT, wherein communicating the second multimedia packets on the second communication channel comprises the remote device transmitting and receiving the second multimedia packets over a second remote link that uses the second RAT, wherein using the second encoding settings instead of the first encoding settings is performed based on the remote device communicating over the second remote link that uses the second RAT.

4. The apparatus of claim 1, wherein, in addition to the first encoding settings, for the first multimedia packets, first camera capture settings specifying a first resolution are used, wherein said capturing the first images from the camera is performed using the first camera capture settings, wherein, in addition to the second encoding settings, for the second multimedia packets, second camera capture settings specifying a second resolution are used, wherein said capturing the second images from the camera is performed using the second camera capture settings.

5. The apparatus of claim 1, wherein the first encoding settings comprise a first encoding bit rate for the real time application, wherein the second encoding settings comprise a second encoding bit rate for the real time application.

6. The apparatus of claim 1, wherein the one or more processing elements are further configured to:
   determine connection conditions of the first communication channel;
   transition to using the second communication channel instead of the first communication channel based on determining the connection conditions of the first communication channel.

7. The apparatus of claim 1, wherein the one or more processing elements are further configured to:
   determine connection conditions of the first communication channel;
   wherein using the second communication channel is performed based on determining the connection conditions of the first communication channel and wherein the second multimedia packets are also communicated over the first communication channel.

8. The apparatus of claim 7, wherein the second multimedia packets comprise non-droppable frames and droppable frames, wherein the non-droppable frames are communicated over both the first and second communication channels, and wherein a lesser number of droppable frames are communicated over the second communication channel than the first communication channel.

9. The apparatus of claim 7, wherein the one or more processing elements are further configured to:
   combine multimedia packets received over the first communication channel and the second communication channel to generate a video stream associated with the real time application.

10. The apparatus of claim 1, wherein communicating the second multimedia packets comprises communicating an intra frame comprising information identifying the second encoding settings.

11. A method for conducting a real time application on a mobile device, the method comprising:
   at the mobile device:
      capturing first images from a camera of the mobile device as part of the real time application;
      communicating first multimedia packets on a first communication channel, wherein at least some of the first multimedia packets correspond to the first images captured from the camera, wherein the first communication channel is used for communication between the mobile device and a remote device, wherein communicating the first multimedia packets on the first communication channel comprises using a first radio access technology (RAT), and wherein while communicating on the first communication channel, first encoding settings are used for the first multimedia packets of the real time application, wherein the first encoding settings comprise a codec for encoding the first multimedia packets;
      capturing second images from the camera of the mobile device as part of the real time application; and
      communicating second multimedia packets on a second communication channel using a second RAT, wherein at least some of the second multimedia packets correspond to the second images captured from the camera, wherein while communicating on the second communication channel, second encoding settings are used for the second multimedia packets of the real time application instead of the first encoding settings, wherein the second encoding settings comprise a codec for encoding the second multimedia packets, wherein using the second encoding settings instead of the first encoding settings is performed based on using the second RAT.

12. The method of claim 11, wherein communicating the first multimedia packets on the first communication channel comprises the remote device transmitting and receiving the first multimedia packets over a first remote link that uses the first RAT, wherein communicating the second multimedia packets on the second communication channel comprises the remote device transmitting and receiving the second multimedia packets over a second remote link that uses the second RAT, wherein using the second encoding settings instead of the first encoding settings is performed based on the remote device communicating over the second remote link that uses the second RAT.

13. The method of claim 11, wherein, in addition to the first encoding settings, for the first multimedia packets, first camera capture settings specifying a first resolution are used, wherein said capturing the first images from the camera is performed using the first camera capture settings, wherein, in addition to the second encoding settings, for the second multimedia packets, second camera capture settings specifying a second resolution are used, wherein said capturing the second images from the camera is performed using the second camera capture settings.

14. The method of claim 11, wherein the first encoding settings comprise a first encoding bit rate for the real time application, wherein the second encoding settings comprise a second encoding bit rate for the real time application.

15. The method of claim 11, further comprising:
   determining connection conditions of the first communication channel;
   wherein using the second communication channel is performed based on determining the connection conditions of the first communication channel and wherein the second multimedia packets are also communicated over the first communication channel.

16. The method of claim 15, wherein the second multimedia packets comprise non-droppable frames and droppable frames, wherein the non-droppable frames are communicated over both the first and second communication channels, and wherein a lesser number of droppable frames are communicated over the second communication channel than the first communication channel.

17. The method of claim 11, wherein communicating the second multimedia packets comprises communicating an intra frame comprising information identifying the second encoding settings.

18. A mobile device configured to perform a real-time application, the mobile device comprising:
- a camera configured to capture images for the real-time application;
- at least one radio, wherein the at least one radio is configured to perform communication with a remote device over a first channel and a second channel; and
- one or more processors coupled to the at least one radio, wherein the one or more processors and the at least one radio are configured to:
  - capture first images from the camera as part of the real time application;
  - communicate first multimedia packets on a first communication channel using the at least one radio, wherein at least some of the first multimedia packets correspond to the first images captured from the camera, wherein the first communication channel is used for communication between the mobile device and the remote device, wherein communicating the first multimedia packets on the first communication channel comprises using a first radio access technology (RAT), and wherein while communicating on the first communication channel, first encoding settings are used for the first multimedia packets of the real time application, wherein the first encoding settings comprise a codec for encoding the first multimedia packets;
  - capture second images from the camera as part of the real time application; and
  - communicate second multimedia packets on a second communication channel using a second RAT, wherein at least some of the second multimedia packets correspond to the second images captured from the camera, wherein while communicating on the second communication channel, second encoding settings are used for the second multimedia packets of the real time application instead of the first encoding settings, wherein the second encoding settings comprise a codec for encoding the second multimedia packets, wherein using the second encoding settings instead of the first encoding settings is performed based on using the second RAT.

19. The mobile device of claim 18, wherein communicating the first multimedia packets on the first communication channel comprises the remote device transmitting and receiving the first multimedia packets over a first remote link that uses the first RAT, wherein communicating the second multimedia packets on the second communication channel comprises the remote device transmitting and receiving the second multimedia packets over a second remote link that uses the second RAT, wherein using the second encoding settings instead of the first encoding settings is performed based on the remote device communicating over the second remote link that uses the second RAT.

20. The mobile device of claim 18, wherein the one or more processing elements are further configured to:
- determine connection conditions of the first communication channel;
- wherein using the second communication channel is performed based on determining the connection conditions of the first communication channel and wherein the second multimedia packets are also communicated over the first communication channel;
- wherein the second multimedia packets comprise non-droppable frames and droppable frames, wherein the non-droppable frames are communicated over both the first and second communication channels, and wherein a lesser number of droppable frames are communicated over the second communication channel than the first communication channel.

* * * * *